US012475515B2

(12) United States Patent
Mast et al.

(10) Patent No.: US 12,475,515 B2
(45) Date of Patent: *Nov. 18, 2025

(54) APPARATUSES, SYSTEMS AND METHODS FOR MITIGATING PROPERTY LOSS BASED ON AN EVENT DRIVEN PROBABLE ROOF LOSS CONFIDENCE SCORE

(71) Applicant: STATE FARM MUTUAL AUTOMOBILE INSURANCE COMPANY, Bloomington, IL (US)

(72) Inventors: Joshua M. Mast, Bloomington, IL (US); Douglas L. Dewey, Bloomington, IL (US); Todd Binion, Bloomington, IL (US); Jeffrey Feid, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/508,963

(22) Filed: Nov. 14, 2023

(65) Prior Publication Data

US 2024/0087042 A1 Mar. 14, 2024

Related U.S. Application Data

(63) Continuation of application No. 17/954,015, filed on Sep. 27, 2022, which is a continuation of application
(Continued)

(51) Int. Cl.
*G06Q 40/08* (2012.01)
*G01W 1/14* (2006.01)

(52) U.S. Cl.
CPC .............. *G06Q 40/08* (2013.01); *G01W 1/14* (2013.01)

(58) Field of Classification Search
None
See application file for complete search history.

(56) References Cited

U.S. PATENT DOCUMENTS

| 5,528,224 A | 6/1996 | Wang |
| 6,424,917 B1 | 7/2002 | Kalkstein et al. |

(Continued)

FOREIGN PATENT DOCUMENTS

| CN | 111626536 A | 9/2020 |
| CN | 113138558 A | 7/2021 |

(Continued)

OTHER PUBLICATIONS

S. Dalal and D. Bassu, "Deep analytics for workplace risk and disaster management," in IBM Journal of Research and Development, vol. 64, No. 1/2, pp. 14:1-14:9, Jan. 1-Mar. 2020. (Year: 2020).*

(Continued)

*Primary Examiner* — Mohammad Z Shaikh
(74) *Attorney, Agent, or Firm* — MARSHALL, GERSTEIN & BORUN LLP

(57) ABSTRACT

Apparatuses, systems and methods are provided for performing insurance property loss mitigation processes based on an event driven probable roof loss confidence score based on a particular weather event, the event driven probable roof loss confidence score associated with a roof of a building. An example method may include receiving a base-line probable roof loss confidence score for the building. The method may further include receiving weather data associated with the particular weather event, that occurred in the geographic area of the building, and hail data associated with the particular weather event. The method also may include estimating at least one attribute of the one or more attributes, and generating the event driven probable roof loss confidence score based on the base-line probable roof loss
(Continued)

confidence score, the weather data, the hail data, and the at least one estimated attribute.

20 Claims, 19 Drawing Sheets

Related U.S. Application Data

No. 16/983,794, filed on Aug. 3, 2020, now Pat. No. 11,488,255.

(56) References Cited

U.S. PATENT DOCUMENTS

| | | | |
|---|---|---|---|
| 8,081,795 B2 | 12/2011 | Brown | |
| 8,280,633 B1 | 10/2012 | Eldering et al. | |
| 8,346,578 B1* | 1/2013 | Hopkins, III | G06Q 40/08 705/14.66 |
| 8,400,299 B1* | 3/2013 | Maroney | G06Q 10/10 340/540 |
| 8,490,006 B1 | 7/2013 | Reeser et al. | |
| 8,527,306 B1 | 9/2013 | Reeser et al. | |
| 8,533,144 B1 | 9/2013 | Reeser et al. | |
| 8,640,038 B1 | 1/2014 | Reeser et al. | |
| 8,665,084 B2 | 3/2014 | Shapiro et al. | |
| 8,890,680 B2 | 11/2014 | Reeser et al. | |
| 8,917,186 B1 | 12/2014 | Grant | |
| 8,976,937 B2 | 3/2015 | Shapiro et al. | |
| 9,049,168 B2 | 6/2015 | Jacob et al. | |
| 9,057,746 B1 | 6/2015 | Houlette et al. | |
| 9,117,349 B2 | 8/2015 | Shapiro et al. | |
| 9,142,119 B1 | 9/2015 | Grant | |
| 9,152,737 B1 | 10/2015 | Micali et al. | |
| 9,183,578 B1 | 11/2015 | Reeser et al. | |
| 9,202,363 B1 | 12/2015 | Grant | |
| 9,262,909 B1 | 2/2016 | Grant | |
| 9,286,772 B2 | 3/2016 | Shapiro et al. | |
| 9,344,330 B2 | 5/2016 | Jacob et al. | |
| 9,424,737 B2 | 8/2016 | Bailey et al. | |
| 9,443,195 B2 | 9/2016 | Micali et al. | |
| 9,472,092 B1 | 10/2016 | Grant | |
| 9,536,148 B2 | 1/2017 | Gross | |
| 9,589,441 B2 | 3/2017 | Shapiro et al. | |
| 9,609,003 B1 | 3/2017 | Chmielewski et al. | |
| 9,665,892 B1 | 5/2017 | Reeser et al. | |
| 9,666,060 B2 | 5/2017 | Reeser et al. | |
| 9,678,206 B2* | 6/2017 | Sneed | G01S 13/58 |
| 9,699,529 B1 | 7/2017 | Petri et al. | |
| 9,739,813 B2 | 8/2017 | Houlette et al. | |
| 9,786,158 B2 | 10/2017 | Beaver et al. | |
| 9,798,979 B2 | 10/2017 | Fadell et al. | |
| 9,798,993 B2 | 10/2017 | Payne et al. | |
| 9,800,570 B1 | 10/2017 | Bleisch | |
| 9,800,958 B1 | 10/2017 | Petri et al. | |
| 9,812,001 B1 | 11/2017 | Grant | |
| 9,888,371 B1 | 2/2018 | Jacob | |
| 9,892,463 B1 | 2/2018 | Hakimi-Boushehri et al. | |
| 9,898,168 B2 | 2/2018 | Shapiro et al. | |
| 9,898,912 B1 | 2/2018 | Jordan, II et al. | |
| 9,911,042 B1 | 3/2018 | Cardona et al. | |
| 9,923,971 B2 | 3/2018 | Madey et al. | |
| 9,942,630 B1 | 4/2018 | Petri et al. | |
| 9,947,202 B1 | 4/2018 | Moon et al. | |
| 9,948,477 B2 | 4/2018 | Marten | |
| 9,970,881 B1* | 5/2018 | Hillman | H04N 7/185 |
| 9,978,033 B1 | 5/2018 | Payne et al. | |
| 9,997,056 B2 | 6/2018 | Bleisch | |
| 10,002,295 B1 | 6/2018 | Cardona et al. | |
| 10,042,341 B1 | 8/2018 | Jacob | |
| 10,047,974 B1 | 8/2018 | Riblet et al. | |
| 10,055,793 B1 | 8/2018 | Call et al. | |
| 10,055,803 B2 | 8/2018 | Orduna et al. | |
| 10,057,664 B1 | 8/2018 | Moon et al. | |
| 10,073,929 B2 | 9/2018 | Vaynriber et al. | |
| 10,102,584 B1 | 10/2018 | Devereaux et al. | |
| 10,102,585 B1 | 10/2018 | Bryant et al. | |
| 10,107,708 B1 | 10/2018 | Schick et al. | |
| 10,134,092 B1 | 11/2018 | Harvey et al. | |
| 10,142,394 B2 | 11/2018 | Chmielewski et al. | |
| 10,176,705 B1 | 1/2019 | Grant | |
| 10,181,079 B2* | 1/2019 | Labrie | G06V 20/176 |
| 10,181,160 B1 | 1/2019 | Hakimi-Boushehri et al. | |
| 10,186,134 B1 | 1/2019 | Moon et al. | |
| 10,198,771 B1 | 2/2019 | Madigan et al. | |
| 10,217,068 B1 | 2/2019 | Davis et al. | |
| 10,229,394 B1 | 3/2019 | Davis et al. | |
| 10,235,716 B2* | 3/2019 | Boutin | G06Q 40/08 |
| 10,244,294 B1 | 3/2019 | Moon et al. | |
| 10,249,158 B1 | 4/2019 | Jordan, II et al. | |
| 10,268,691 B2* | 4/2019 | Emison | G06Q 10/083 |
| 10,282,787 B1 | 5/2019 | Hakimi-Boushehri et al. | |
| 10,282,788 B1 | 5/2019 | Jordan, II et al. | |
| 10,282,961 B1 | 5/2019 | Jordan, II et al. | |
| 10,295,431 B1 | 5/2019 | Schick et al. | |
| 10,296,978 B1 | 5/2019 | Corder et al. | |
| 10,297,138 B2 | 5/2019 | Reeser et al. | |
| 10,304,313 B1 | 5/2019 | Moon et al. | |
| 10,311,302 B2 | 6/2019 | Kottenstette et al. | |
| 10,323,860 B1 | 6/2019 | Riblet et al. | |
| 10,325,473 B1 | 6/2019 | Moon et al. | |
| 10,332,059 B2 | 6/2019 | Matsuoka et al. | |
| 10,346,811 B1 | 7/2019 | Jordan, II et al. | |
| 10,353,359 B1 | 7/2019 | Jordan, II et al. | |
| 10,354,386 B1 | 7/2019 | Farnsworth et al. | |
| 10,356,303 B1 | 7/2019 | Jordan, II et al. | |
| 10,366,288 B1 | 7/2019 | Kottenstette et al. | |
| 10,373,256 B1* | 8/2019 | Allen | G06Q 10/10 |
| 10,387,966 B1 | 8/2019 | Shah et al. | |
| 10,388,135 B1 | 8/2019 | Jordan, II et al. | |
| 10,412,169 B1 | 9/2019 | Madey et al. | |
| 10,430,890 B1* | 10/2019 | Corder | G06Q 40/08 |
| 10,446,000 B2 | 10/2019 | Friar et al. | |
| 10,467,476 B1 | 11/2019 | Cardona et al. | |
| 10,469,282 B1 | 11/2019 | Konrardy et al. | |
| 10,480,825 B1 | 11/2019 | Riblet et al. | |
| 10,482,746 B1 | 11/2019 | Moon et al. | |
| 10,497,250 B1* | 12/2019 | Hayward | G06N 3/088 |
| 10,506,411 B1 | 12/2019 | Jacob | |
| 10,514,669 B1 | 12/2019 | Call et al. | |
| 10,515,372 B1 | 12/2019 | Jordan, II et al. | |
| 10,522,009 B1 | 12/2019 | Jordan, II et al. | |
| 10,546,478 B1 | 1/2020 | Moon et al. | |
| 10,547,918 B1 | 1/2020 | Moon et al. | |
| 10,565,541 B2 | 2/2020 | Payne et al. | |
| 10,573,146 B1 | 2/2020 | Jordan, II et al. | |
| 10,573,149 B1 | 2/2020 | Jordan, II et al. | |
| 10,579,028 B1 | 3/2020 | Jacob | |
| 10,586,177 B1 | 3/2020 | Choueiter et al. | |
| 10,607,295 B1 | 3/2020 | Hakimi-Boushehri et al. | |
| 10,634,576 B1 | 4/2020 | Schick et al. | |
| 10,643,072 B2 | 5/2020 | Kottenstette et al. | |
| 10,664,922 B1 | 5/2020 | Madigan et al. | |
| 10,679,292 B1 | 6/2020 | Call et al. | |
| 10,685,402 B1 | 6/2020 | Bryant et al. | |
| 10,692,160 B1* | 6/2020 | Lyons | G06V 20/17 |
| 10,699,346 B1 | 6/2020 | Corder et al. | |
| 10,699,348 B1 | 6/2020 | Devereaux et al. | |
| 10,726,494 B1 | 7/2020 | Shah et al. | |
| 10,726,500 B1 | 7/2020 | Shah et al. | |
| 10,726,558 B2 | 7/2020 | Ruda et al. | |
| 10,733,671 B1 | 8/2020 | Hakimi-Boushehri et al. | |
| 10,733,868 B2 | 8/2020 | Moon et al. | |
| 10,735,829 B2 | 8/2020 | Petri et al. | |
| 10,740,691 B2 | 8/2020 | Choueiter et al. | |
| 10,741,033 B1 | 8/2020 | Jordan et al. | |
| 10,750,252 B2 | 8/2020 | Petri et al. | |
| 10,755,357 B1* | 8/2020 | Davis | G06Q 50/163 |
| 10,776,883 B2 | 9/2020 | Labrie et al. | |
| 10,795,329 B1 | 10/2020 | Jordan, II et al. | |
| 10,796,149 B2 | 10/2020 | Labrie et al. | |
| 10,796,557 B2 | 10/2020 | Sundermeyer et al. | |
| 10,802,477 B1 | 10/2020 | Konrardy et al. | |
| 10,804,700 B2 | 10/2020 | Cohen et al. | |
| 10,818,105 B1 | 10/2020 | Konrardy et al. | |

(56) References Cited

U.S. PATENT DOCUMENTS

| | | |
|---|---|---|
| 10,823,458 B1 | 11/2020 | Riblet et al. |
| 10,824,971 B1 | 11/2020 | Davis et al. |
| 10,825,320 B1 | 11/2020 | Moon et al. |
| 10,825,321 B2 | 11/2020 | Moon et al. |
| 10,832,225 B1 | 11/2020 | Davis et al. |
| 10,846,800 B1 | 11/2020 | Bryant et al. |
| 10,885,587 B1 | 1/2021 | Mendoza et al. |
| 10,907,844 B2 | 2/2021 | Ribbich et al. |
| 10,922,756 B1 | 2/2021 | Call et al. |
| 10,922,948 B1 | 2/2021 | Moon et al. |
| 10,943,447 B1 | 3/2021 | Jordan, II et al. |
| 10,970,990 B1 | 4/2021 | Jacob |
| 10,977,490 B1* | 4/2021 | Bokshi-Drotar ...... G06T 7/0004 |
| 10,990,069 B1 | 4/2021 | Jacob |
| 11,003,334 B1 | 5/2021 | Conway et al. |
| 11,004,320 B1 | 5/2021 | Jordan, II et al. |
| 11,015,997 B1 | 5/2021 | Schick et al. |
| 11,017,480 B2 | 5/2021 | Shah et al. |
| 11,017,487 B1* | 5/2021 | Campbell .............. G06Q 50/16 |
| 11,042,137 B1 | 6/2021 | Call et al. |
| 11,042,942 B1 | 6/2021 | Hakimi-Boushehri et al. |
| 11,043,098 B1 | 6/2021 | Jordan, II et al. |
| 11,049,078 B1 | 6/2021 | Jordan, II et al. |
| 11,049,189 B2 | 6/2021 | Shah et al. |
| 11,055,786 B2 | 7/2021 | Shreve et al. |
| 11,074,658 B1 | 7/2021 | Burgess et al. |
| 11,074,659 B1 | 7/2021 | Hakimi-Boushehri et al. |
| 11,100,594 B1 | 8/2021 | West et al. |
| 11,118,812 B1 | 9/2021 | Riblet et al. |
| 11,126,708 B2 | 9/2021 | Reimer |
| 11,131,597 B1* | 9/2021 | Oakes, III .............. G06T 17/00 |
| 11,151,378 B2 | 10/2021 | Kottenstette et al. |
| 11,164,257 B1 | 11/2021 | Devereaux et al. |
| 11,210,552 B2 | 12/2021 | Kossyk et al. |
| 11,210,741 B1* | 12/2021 | Allen ..................... G06Q 40/08 |
| 11,222,426 B2 | 1/2022 | Richter et al. |
| 11,232,150 B2 | 1/2022 | Vianello et al. |
| 11,232,873 B1 | 1/2022 | Aspro et al. |
| 11,257,166 B2* | 2/2022 | Coonrod .............. G06V 20/176 |
| 11,277,465 B2 | 3/2022 | Chmielewski et al. |
| 11,348,193 B1 | 5/2022 | Konrardy et al. |
| 11,361,544 B2* | 6/2022 | Splittstoesser ......... G06Q 50/16 |
| 11,367,265 B2 | 6/2022 | Vianello et al. |
| 11,417,212 B1 | 8/2022 | Farooqui et al. |
| 11,430,069 B1* | 8/2022 | Pedersen .............. G06V 20/176 |
| 11,593,887 B1 | 2/2023 | Gaudin et al. |
| 11,634,214 B1 | 4/2023 | Parchment et al. |
| 11,709,253 B1 | 7/2023 | Maestas |
| 11,941,702 B1 | 3/2024 | Devereaux et al. |
| 12,182,873 B2* | 12/2024 | Mast ....................... G06Q 40/08 |
| 12,354,250 B1* | 7/2025 | McKinney .............. G06T 17/10 |
| 2009/0216552 A1 | 8/2009 | Watrous |
| 2009/0265193 A1 | 10/2009 | Collins et al. |
| 2014/0019166 A1* | 1/2014 | Swanson ................ G06Q 40/08 705/4 |
| 2014/0067332 A1* | 3/2014 | Chen ....................... G06F 30/13 703/1 |
| 2014/0176362 A1* | 6/2014 | Sneed ..................... G01S 13/95 342/26 R |
| 2014/0245165 A1 | 8/2014 | Battcher et al. |
| 2014/0245204 A1 | 8/2014 | Battcher et al. |
| 2014/0246165 A1* | 9/2014 | Minisandram ............ C22B 9/20 72/352 |
| 2014/0266669 A1 | 9/2014 | Fadell et al. |
| 2014/0358592 A1 | 12/2014 | Wedig et al. |
| 2015/0061859 A1 | 3/2015 | Matsuoka et al. |
| 2015/0073864 A1 | 3/2015 | Labrie et al. |
| 2015/0082883 A1 | 3/2015 | Moffatt |
| 2015/0170288 A1 | 6/2015 | Harton et al. |
| 2015/0228031 A1* | 8/2015 | Emison ................. G06F 16/116 705/4 |
| 2015/0302529 A1* | 10/2015 | Jagannathan .......... G06Q 40/08 705/4 |
| 2015/0347910 A1 | 12/2015 | Fadell et al. |
| 2015/0348204 A1 | 12/2015 | Daues |
| 2016/0048923 A1 | 2/2016 | Maher et al. |
| 2016/0189531 A1 | 6/2016 | Modi et al. |
| 2016/0265993 A1 | 9/2016 | Sutter et al. |
| 2016/0267602 A1* | 9/2016 | Boutin ..................... G06F 16/29 |
| 2016/0334545 A1 | 11/2016 | Varelas et al. |
| 2017/0039307 A1 | 2/2017 | Koger et al. |
| 2017/0048923 A1* | 2/2017 | Wang ..................... H04W 80/06 |
| 2017/0249510 A1 | 8/2017 | Labrie et al. |
| 2017/0270612 A1 | 9/2017 | Howe et al. |
| 2017/0270650 A1* | 9/2017 | Howe ............... G06F 18/24133 |
| 2017/0330282 A1 | 11/2017 | Pratt et al. |
| 2017/0352099 A1 | 12/2017 | Howe et al. |
| 2017/0352104 A1 | 12/2017 | Hanson et al. |
| 2018/0071949 A1 | 3/2018 | Giles |
| 2018/0336418 A1 | 11/2018 | Splittstoesser |
| 2019/0095764 A1 | 3/2019 | Li |
| 2019/0114717 A1 | 4/2019 | Labrie et al. |
| 2019/0147244 A1 | 5/2019 | Labrie et al. |
| 2019/0213688 A1* | 7/2019 | Boutin ..................... G06F 16/23 |
| 2019/0251520 A1 | 8/2019 | Bentley, III et al. |
| 2019/0304026 A1* | 10/2019 | Lyman ................... G06Q 40/08 |
| 2020/0066257 A1 | 2/2020 | Smith et al. |
| 2020/0134573 A1* | 4/2020 | Vickers .................. G06F 16/29 |
| 2020/0134728 A1 | 4/2020 | Vickers |
| 2020/0134753 A1 | 4/2020 | Vickers |
| 2020/0302549 A1 | 9/2020 | Jordan, II et al. |
| 2020/0327791 A1 | 10/2020 | Moon et al. |
| 2021/0027528 A1* | 1/2021 | Labrie ..................... G06T 17/00 |
| 2021/0035432 A1 | 2/2021 | Moon et al. |
| 2021/0042843 A1 | 2/2021 | Bryant et al. |
| 2021/0089811 A1 | 3/2021 | Strong |
| 2021/0133891 A1* | 5/2021 | Jagannathan .......... G06Q 40/08 |
| 2021/0158671 A1 | 5/2021 | Jordan, II et al. |
| 2021/0192631 A1* | 6/2021 | Coonrod ............... G06Q 40/08 |
| 2021/0241439 A1* | 8/2021 | Lutich ................... G06V 10/764 |
| 2021/0279811 A1 | 9/2021 | Waltman et al. |
| 2021/0312789 A1 | 10/2021 | Linn |
| 2021/0383461 A1* | 12/2021 | Richardson ............ G06V 20/10 |
| 2022/0101275 A1 | 3/2022 | Aspro et al. |
| 2022/0317639 A1 | 10/2022 | Karri et al. |

FOREIGN PATENT DOCUMENTS

| | | |
|---|---|---|
| JP | 2003157357 A | 5/2003 |
| KR | 20150129845 A | 11/2015 |
| WO | WO-2014159131 A2 | 10/2014 |
| WO | WO-2016081511 A2 | 5/2016 |
| WO | WO-2021087185 A1 | 5/2021 |
| WO | WO-2021/248030 A1 | 12/2021 |
| WO | WO-2022/165303 A1 | 8/2022 |

OTHER PUBLICATIONS

Aufranc, Haven Open Source App Transforms Your Old Android Smartphone into a Smart Security Camera, CNX Software—Embedded Systems News, Dec. 23, 2017.

Chen, Smart Home, Investopedia, updated Feb. 25, 2020.

Dube, How to Build a Security Camera Nework Out of Old Smartphones, downloaded from the Internet at: <https://www.makeusof.com/tag/how-to-build-a-security-camera-network-out-of-old-smartphones> Jul. 12, 2017.

Upgrading your roof? Consider these hurricane-resistant tips, Renew Financial, Oct. 7, 2016.

Deep analytics for workplace risk and disaster management, IBM Journal of Research and Development, 64(1/2):14.1-14.9 (Jan. 2020).

Alud et al., Planning for Atmospheric Hazards and Disaster Management Under Changing Climate Conditions, IEEE EIC Climate Change Conference, 1-9 (2006).

Hail Monitoring System, HailSens Monitoring (Oct. 2020).

Powers et al., Measuring and modeling the effect of snow on photovoltaic system performance, 35th IEEE Photovoltaic Specialists Conference, 000973-000978 (2010).

Beck et al., Data Descriptor: Present and future Koppen-Geiger climate classification maps at 1-km resolution, Scientific Data, 5:180214 (2018).

(56) References Cited

OTHER PUBLICATIONS

Brownlee, A gentle introduction to probability density estimation, Machine Learning Mastery.com, Jul. 24, 2020 (53 pp).

Chakraverty et al., IoT based Weather and Location Aware Recommender System, 8th International Conference on Cloud Computing, Data Science & Engineering (Confluence), 610-617 (2018).

Dean, Probability Weighting, Lecture Notes for Spring 2015 Behavioral Economics—Brown University (2015).

Gibbons et al., Land management practices associated with house loss in wildfires, PLoS One, 7(1):e29212 (2012).

Herrera et al., A review of current and future weather data for building simulation, Building Serv. Eng. Res. Technol., 38(5):602-27 (2017).

Majumdar et al., Design of Weather Monitoring System and Smart Home Automation, IEEE International Conference on System, Computation, Automation and Networking (ICSCAN), 1-5 (2018).

McHale et al., Stormy future for U.S. property/casualty insurers: The growing costs and risks fo extreme weather events, Ceres, Sep. 2012).

Saghir et al., Weighted distributions: A brief review, perspective and characterizations, International Journal of Statistics and Probability, vol. 6, No. 3, 23 pages (2017).

Scheel et al., A Bayesian hierarchical model with spatial variable selection: the effect of weather on insurance claims, Appl. Statist., 62, Part 1, pp. 85-100 (2013).

* cited by examiner

APPARATUSES, SYSTEMS AND METHODS FOR MITIGATING PROPERTY LOSS BASED ON AN EVENT DRIVEN PROBABLE ROOF LOSS CONFIDENCE SCORE

CROSS-REFERENCE TO RELATED APPLICATION

This application is a continuation of U.S. patent application Ser. No. 17/954,015, entitled "APPARATUSES, SYSTEMS AND METHODS FOR MITIGATING PROPERTY LOSS BASED ON AN EVENT DRIVEN PROBABLE ROOF LOSS CONFIDENCE SCORE," filed on Sep. 27, 2022, which is a continuation of U.S. patent application Ser. No. 16/983,794, entitled "APPARATUSES, SYSTEMS AND METHODS FOR MITIGATING PROPERTY LOSS BASED ON AN EVENT DRIVEN PROBABLE ROOF LOSS CONFIDENCE SCORE," filed on Aug. 3, 2020, which are incorporated herein by reference in their entirety.

TECHNICAL FIELD

The present disclosure is directed to apparatuses, systems and methods for mitigating property loss. More particularly, the present disclosure is directed to apparatuses, systems and methods for mitigating property loss based on an event driven probable roof loss confidence score.

BACKGROUND

Storm damage (e.g., wind damage, hail damage, rain damage, etc.) to an exterior of a building (e.g., a roof of a building, siding on a building, exterior windows of a building, etc.). A roof of a building, for example, may represent a line of defense against additional property damage from high winds, rain, and hail.

Accordingly, identifying damaged buildings as soon as possible after a storm and repairing the damage (at least temporarily) is desirable. For example, a hail storm may damage a roof of a building to an extent that water may leak through the roof causing additional damage to the roof and/or other portions of the building.

Large-scale storms may impact a geographic area that may include thousands of buildings. Insurance companies, for example, may receive hundreds of thousands of insurance claims each year associated with storm damage. While an insurance company may be motivated to repair initial storm damage soon after an associated storm, the insurance company has to avoid payment of unnecessary claims. Often times, for example, an insurance company will dispatch an insurance adjustor to a property site in order to assess storm damage claims.

An insurance company may wish to expedite the claim process. Moreover, an insurance company may or may not be obligated to pay a claim based on the collected data and the applicable insurance contract. Moreover, an insurance company may be obligated to pay a claim based on an associated insurance contract.

Apparatuses, systems and methods are needed to expedite property damage insurance claims that are associated with storm damage. Apparatuses, systems and methods are also needed to generate a probable building exterior damage confidence score for an exterior of at least one building. Apparatuses, systems and methods are further needed to generate a base-line probable roof damage confidence score for a roof of at least one building. Apparatuses, systems and methods are further needed to generate property insurance underwriting data based on a base-line probable roof damage confidence score for a roof of at least one building. Apparatuses, systems and methods are yet further needed to generate a probable roof damage confidence score for a roof of at least one building. Apparatuses, systems and methods are needed to generate insurance property damage claim data based on a probable roof damage confidence score. Apparatuses, systems and methods are needed to generate insurance property loss mitigation data based on a probable roof damage confidence score.

SUMMARY

An example embodiment is a system for performing an insurance property loss mitigation process based on an event driven probable roof loss confidence score based on a particular weather event, wherein the event driven probable roof loss confidence score is associated with a roof of a building. The system may comprise: one or more processors; a non-transitory computer-readable medium; and instructions stored on the non-transitory computer-readable medium. When executed by the one or more processors, the instructions cause the one or more processors to: receive a base-line probable roof loss confidence score for the building, wherein the base-line probable roof loss confidence score is at least partially based on historical weather data representative of storm attributes associated with historical storms that have occurred in a geographic area that includes a geographic location of the building; receive weather data, wherein the weather data is representative of storm attributes associated with a storm, associated with the particular weather event, that occurred in the geographic area; receive hail data, wherein the hail data is representative of one or more attributes of hail, associated with the particular weather event, that has impacted the geographic area, the hail data including at least one of image data, video data, or audio data collected by a smart home device; estimate at least one attribute of the one or more attributes based on the at least one of the image data, the video data, or the audio data; and generate the event driven probable roof loss confidence score based on the base-line probable roof loss confidence score, the weather data, the hail data, and the at least one estimated attribute.

Another example embodiment is a method for performing an insurance property loss mitigation process based on an event driven probable roof loss confidence score based on a particular weather event, wherein the event driven probable roof loss confidence score is associated with a roof of a building. The method may be performed by one or more processors and may include: receiving a base-line probable roof loss confidence score for the building, wherein the base-line probable roof loss confidence score is at least partially based on historical weather data representative of storm attributes associated with historical storms that have occurred in a geographic area that includes a geographic location of the building; receiving weather data, wherein the weather data is representative of storm attributes associated with a storm, associated with the particular weather event, that occurred in the geographic area; receiving hail data, wherein the hail data is representative of one or more attributes of hail, associated with the particular weather event, that has impacted the geographic area, the hail data including at least one of image data, video data, or audio data collected by a smart home device; estimating at least one attribute of the one or more attributes based on the at least one of the image data, the video data, or the audio data; and generating the event driven probable roof loss confidence score based on the base-line probable roof loss confidence score, the weather data, the hail data, and the at least one estimated attribute.

A further example embodiment is a computer-readable medium storing instructions for performing an insurance property loss mitigation process based on an event driven probable roof loss confidence score based on a particular weather event, wherein the event driven probable roof loss confidence score is associated with a roof of a building. The instructions, when executed by one or more processors, cause the one or more processors to: receive a base-line probable roof loss confidence score for the building, wherein the base-line probable roof loss confidence score is at least partially based on historical weather data representative of storm attributes associated with historical storms that have occurred in a geographic area that includes a geographic location of the building; receive weather data, wherein the weather data is representative of storm attributes associated with a storm, associated with the particular weather event, that occurred in the geographic area; receive hail data, wherein the hail data is representative of one or more attributes of hail, associated with the particular weather event, that has impacted the geographic area, the hail data including at least one of image data, video data, or audio data collected by a smart home device; estimate at least one attribute of the one or more attributes based on the at least one of the image data, the video data, or the audio data; and generate the event driven probable roof loss confidence score based on the base-line probable roof loss confidence score, the weather data, the hail data, and the at least one estimated attribute.

BRIEF DESCRIPTION OF THE FIGURES

The Figures described below depict various aspects of computer-implemented methods, systems comprising computer-readable media, and electronic devices disclosed therein. It should be understood that each Figure depicts an embodiment of a particular aspect of the disclosed methods, media, and devices, and that each of the Figures is intended to accord with a possible embodiment thereof. Further, wherever possible, the following description refers to the reference numerals included in the following Figures, in which features depicted in multiple Figures are designated with consistent reference numerals. The present embodiments are not limited to the precise arrangements and instrumentalities shown in the Figures.

Figure 1A:
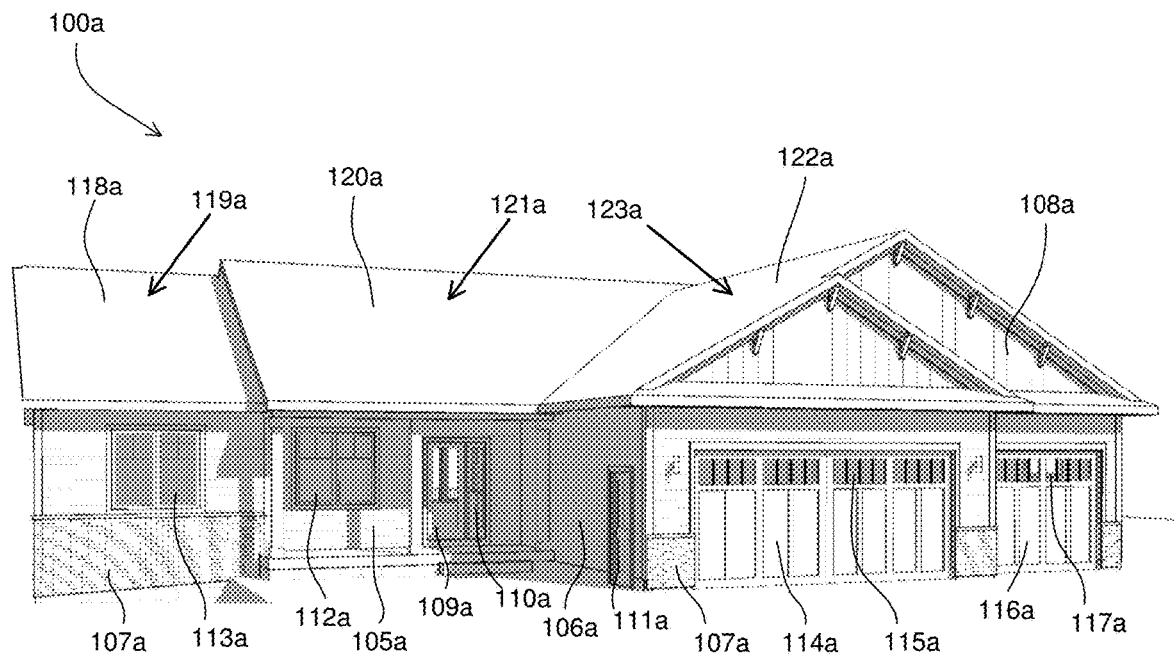
FIGS. 1A-G depict various views of an example building site.
Figure 1B:
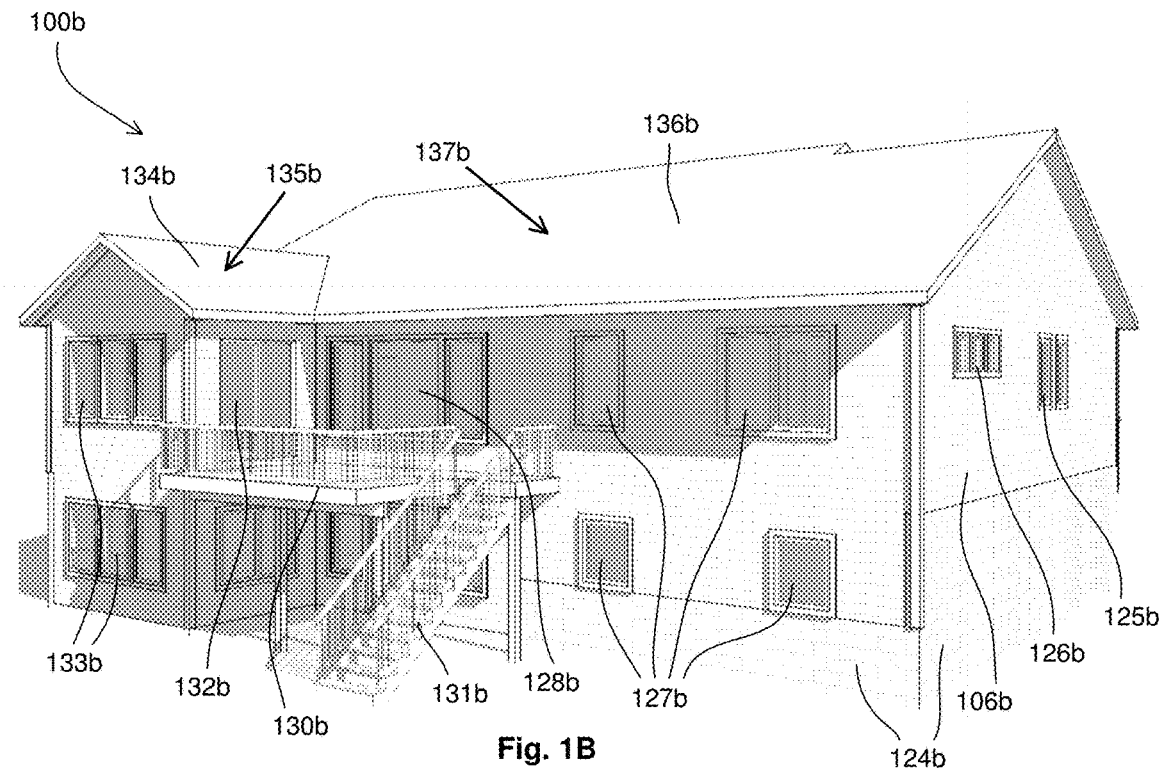
Figure 1C:
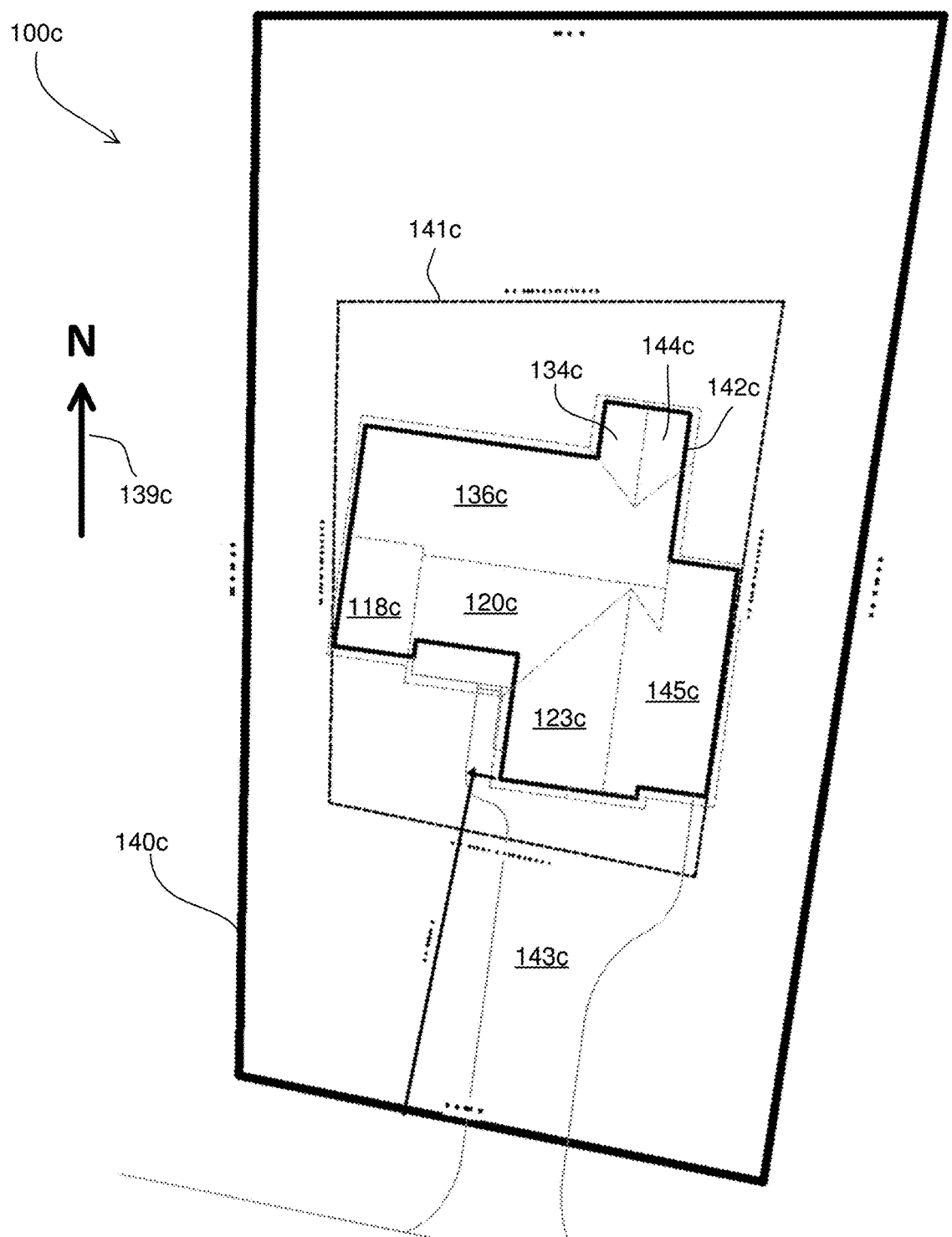
Figure 1D:
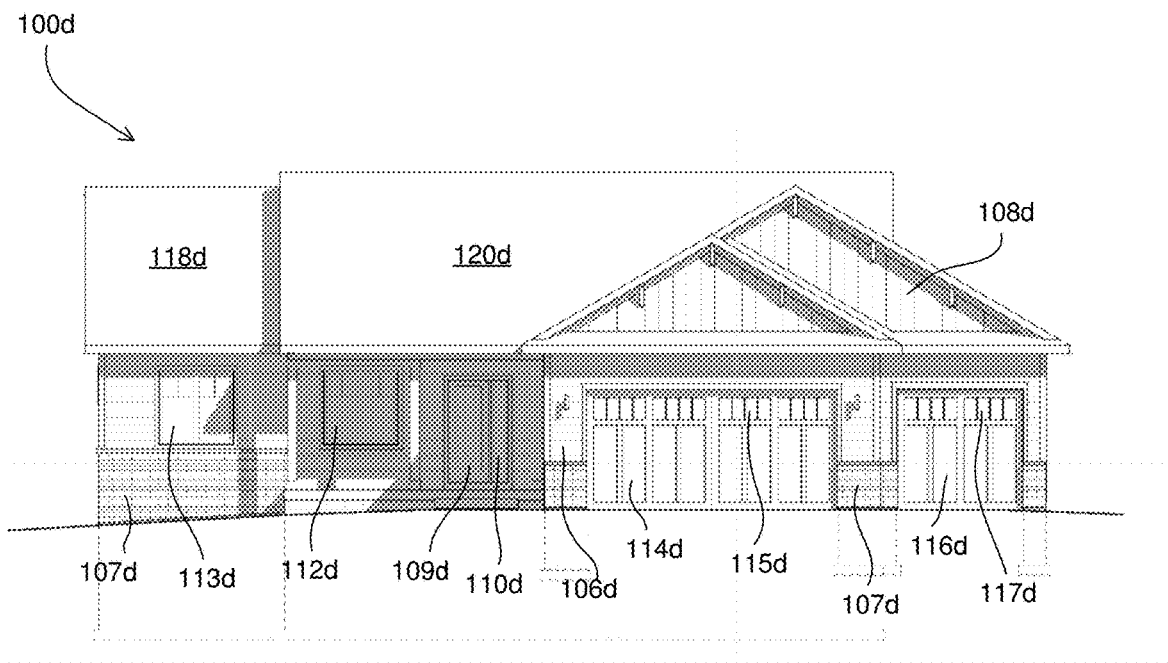
Figure 1E:
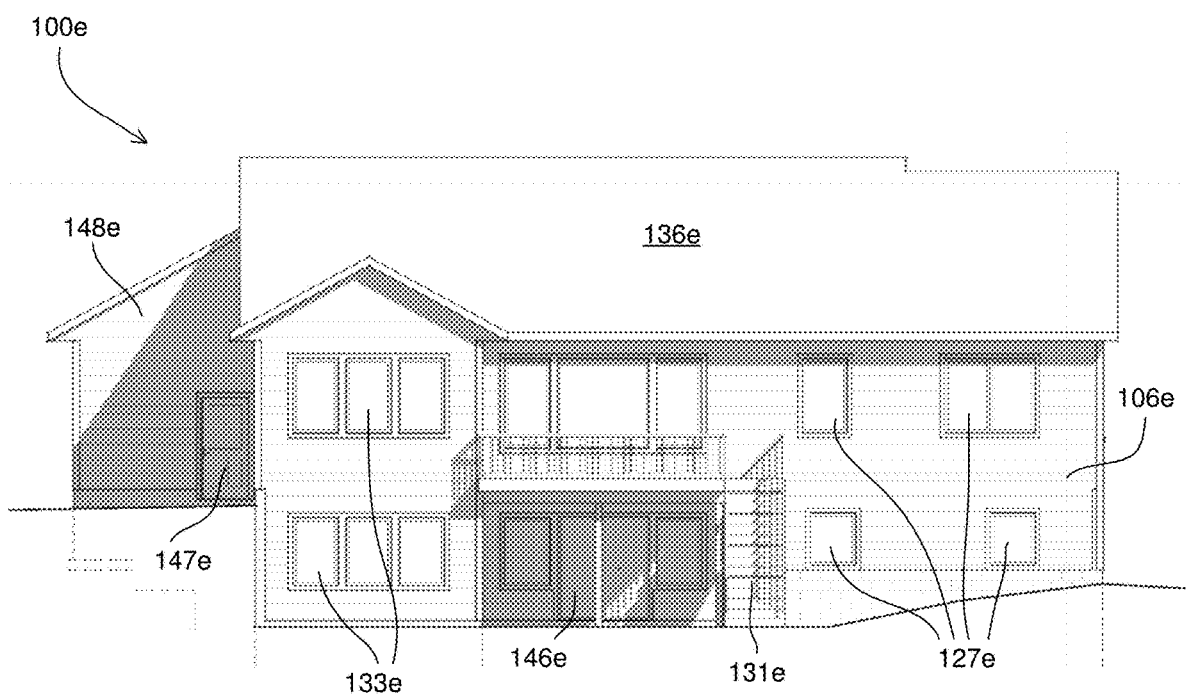
Figure 1F:
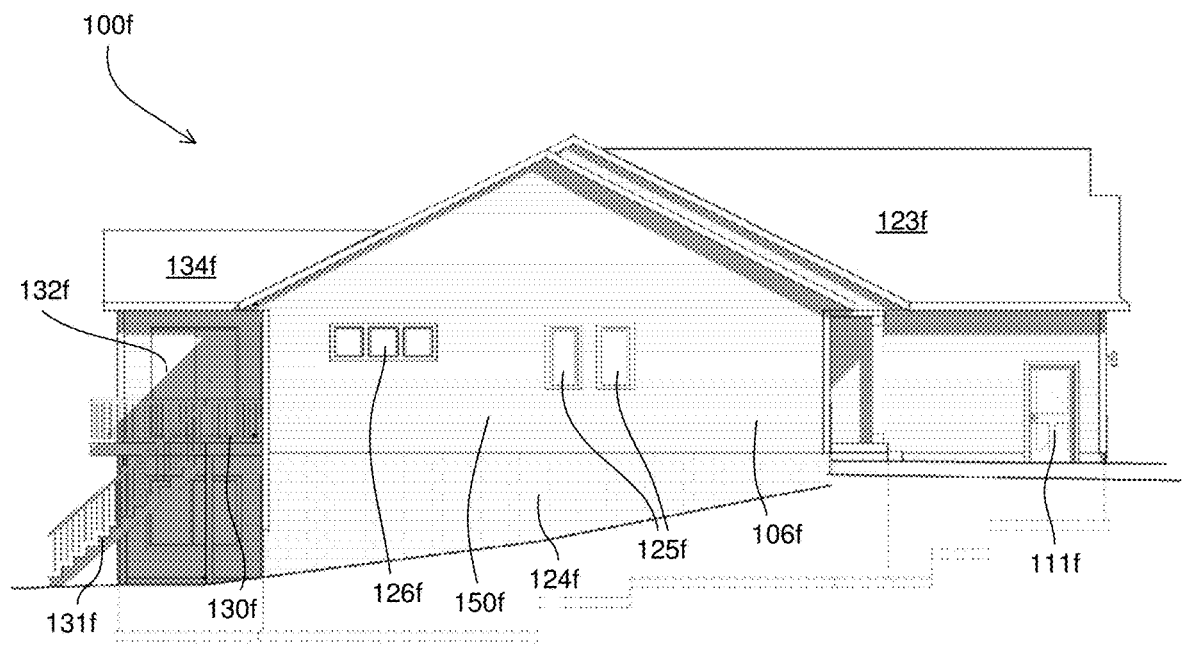
Figure 1G:
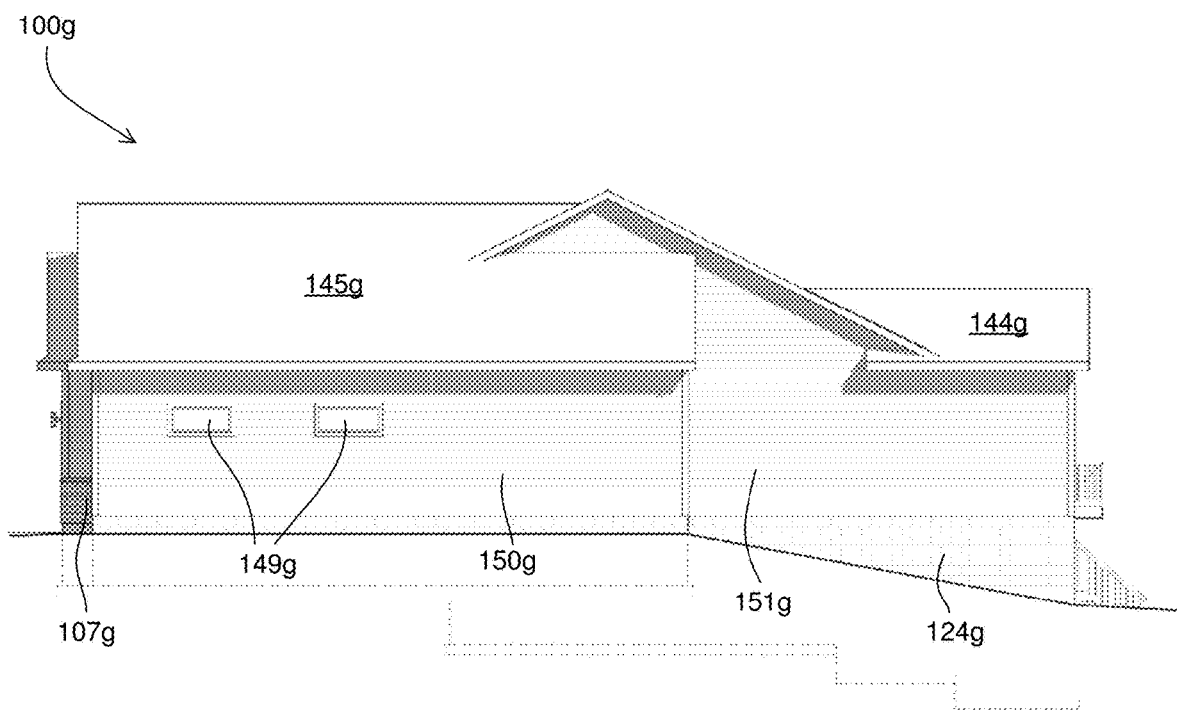

The Figures depict aspects of the present invention for purposes of illustration only. One skilled in the art will readily recognize from the following discussion that alternate aspects of the structures and methods illustrated herein may be employed without departing from the principles of the invention described herein.

DETAIL DESCRIPTION

An insurance company, for example, may implement a system (e.g., a computing system 300 of FIG. 3) to underwrite property insurance for a building. For example, a potential insurance customer may request a quote for property insurance for a building from an insurance company. As described in detail herein, the system 300 may generate a base-line probable roof loss confidence score for a roof of the building based on, for example, building data (e.g., a geographic location of a building, a date on which a building was built, etc.), roof data (e.g., a type of roofing material, an impact resistance rating of a roofing material, a date on which a roof was installed, etc.), historical weather data (e.g., historical wind speeds associated with historical storms in a geographic area associated with the building, historical wind directions associated with historical storms in a geographic area associated with the building, historical lengths of time of historical storms that impacted a geographic area associated with the building, etc.), historical hail data (e.g., sizes of hail that have historically impacted a geographic area associated with the building, hardness of hail that have historically impacted a geographic area associated with the building, lengths of time hail historically impacted a geographic area associated with the building, a three-dimensional shape of the hail that has historically impacted a geographic area associated with the building, etc.).

In another example, the insurance company may implement the system 300 to respond to and/or anticipate property damage claims. For example, a storm may impact a geographic area that includes at least one building that is insured by the company. The apparatuses, systems and methods, as described herein, may be incorporated into an insurance claims process, and may be reflected in a recommended policyholder claim payment under the terms of an associated insurance contract. As described in detail herein, the system 300 may generate a probable roof loss confidence score for the roof of the building based on, for example, base-line roof loss confidence score data (e.g., base-line probable roof loss confidence score data generated at the time of property insurance underwriting), weather data (e.g., a geographic area impacted by a storm, wind speed associated with a storm, wind direction associated with a storm, a length of time a storm impacted a particular geographic location, etc.), and hail data (e.g., a size of hail, a hardness of hail, a length of time hail impacted a geographic area, a three-dimensional shape of the hail, etc.).

Additionally, Apparatuses, systems and methods are provided that may expedite property damage insurance claims associated with storm damage. Apparatuses, systems and methods are also provided that may generate a probable building exterior damage confidence score for an exterior of at least one building. Apparatuses, systems and methods are further provided that may generate a base-line probable roof damage confidence score for a roof of at least one building. Apparatuses, systems and methods are provided that may generate property insurance underwriting data based on a base-line probable roof damage confidence score. Apparatuses, systems and methods are provided that may generate a probable roof damage confidence score for a roof of at least one building. Apparatuses, systems and methods are provided that may generate insurance property damage claim data based on a probable roof damage confidence score. Apparatuses, systems and methods are provided that may generate insurance property loss mitigation data based on a probable roof damage confidence score.

Turning to FIGS. 1A-G, a building site 100a-g may include a building 142c physically located on a building site 140c. The building 142c may be oriented relative to geographic cardinal directions 139c within a building area 141c. The building 142c may include a plurality of roof sections 118a,c,d, 120a,c,d, 122a,c,f, 134b,c,f, 136b,c,e, 144c,g, 145c,g. As specifically illustrated with respect to FIGS. 1A and 1B, line 119a is tangent to a plane associated with roof section 118a,c,d; line 121a is tangent to a plane associated with roof section 120a,c,d; line 123a is tangent to a plane associated with roof section 122a,c,f; line 135b is tangent to a plane associated with roof section 134b,c,f; and line 119a is tangent to a plane associated with roof section 136b,c,e. As described herein, hail, wind, rain, etc. may impact any given roof section 118a,c,d, 120a,c,d, 122a,c,f, 134b,c,f, 136b,c,e, 144c,g, 145c,g relative to a respective tangent line 119a, 121a, 123a, 135b, 137b differently than any other roof section. In any event, a building site 140c may include an access drive 143c.

The building 142c may include a front 105a (i.e., the front 105a is oriented generally SSW with respect to geographic cardinal directions 139c) having exterior siding 106a,b,d,e (e.g., vinyl siding, wood siding, laminate siding, aluminum siding, etc.), cultured stone exterior 107a,b,g, shake exterior siding 108a,d, a front entrance door 109a,d, a sidelight 110a,d, a garage walk-in door 111a,f, a front porch window 112a,d, a picture window 113a,d, a two-car garage door 114a,d with windows 115a,d, and a one-car garage door 116a,d with windows 117a,d.

The building 142c may include a rear 148e (i.e., the rear 148e is oriented generally NNE with respect to geographic cardinal directions 139c) having a rear walk-in garage door 147e, rear windows 127b,e, 133b,e, sliding rear doors 128b, 132b,f, 146e, and a rear deck 130b,f with steps 131b,f.

The building 142c may include a first side 150f (i.e., the first end 150f is oriented generally WNW with respect to geographic cardinal directions 139c) having exterior windows 125f, 126f and basement exterior wall 124f. The building 142c may include a second side 151g (i.e., the second end 151g is oriented generally ESE with respect to geographic cardinal directions 139c) having exterior windows 149g and basement exterior wall 124f.

Figure 2A:
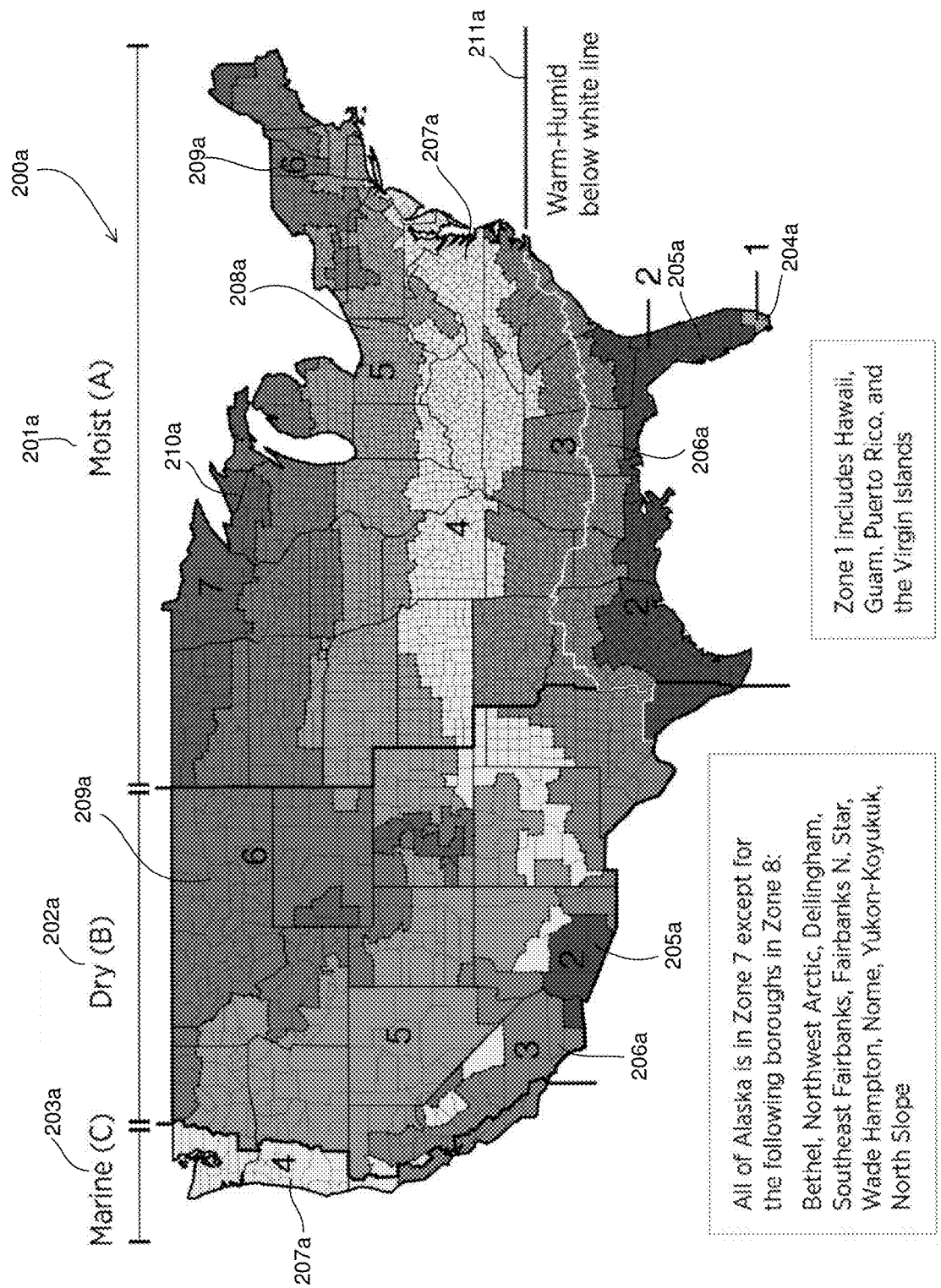
FIGS. 2A and 2B depict example climate zone information for the United States.
Figure 2B:
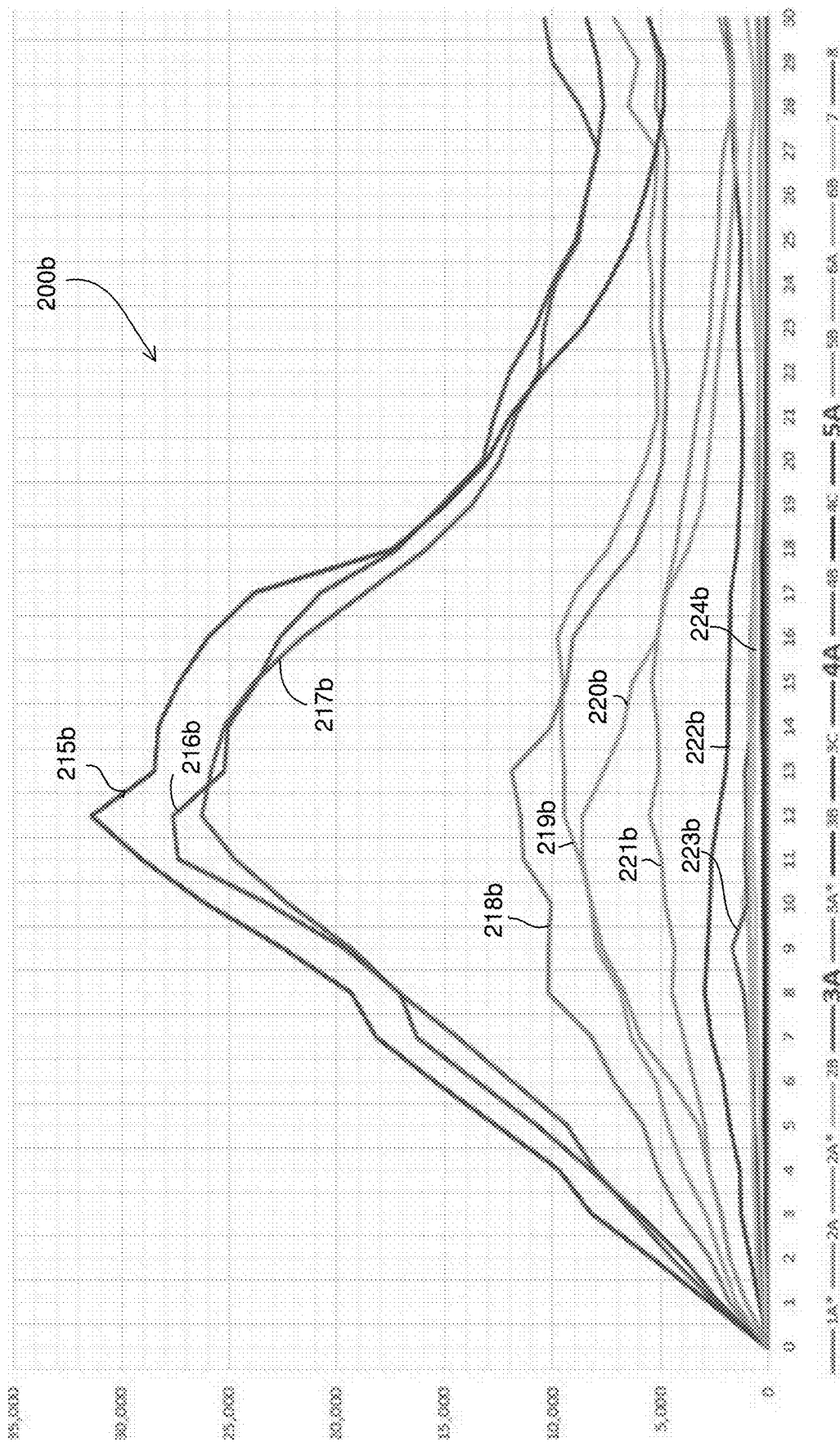

With reference to FIGS. 2A and 2B, climate zone information for the United States 200a may include three generally latitudinally extending columns 201a-203a (i.e., "moist (A)", "dry (B)", and "Marine (C)"), with each column 201a-203c divided into seven generally longitudinally extending rows 204a-210a (i.e., "Zones 1-7"). Each climate zone may then be referenced as, for example, "5A" or "4C" (i.e., climate zone graph lines 215b-224b).

As illustrated in FIG. 2B, a graph 200b may illustrate how exterior building material performance (e.g., roofing material, siding material, windows, gutters, down spouts, etc.) may vary with respect to a climate zone within which an associated building 142c is physically located. For example, a building located in climate zone 215b (i.e., climate zone 5A) may be more likely to experience building exterior damage (e.g., roof damage, siding damage, exterior widow damage, gutter damage, down spout damage, etc.) compared to a building located in climate zone 217b (i.e., climate zone 4C).

The X-Axis of the graph of FIG. 2B may, for example, be representative of a calculated roof age (CRA) for an asphalt composite shingle, shown as ranging from 0-30 years. The Y-Axis of the graph of FIG. 2B may, for example, be representative of a claim count, shown as ranging from 0-35,000. Certain assumptions may be employed to complete a respective data set that includes an estimated roof year (RY), if an actual roof year is, for example, not included in an initial insurance policy data extraction. Associated assumptions may include: 1) roof year (RY)=roof install year (RIY) (Notably, a roof year (RY) may be a pre-populated field in an insurance company policy master data set); 2) If the roof year (RY) field is blank in an associated entry of a roof data set, then roof year (RY)=Year Built (YB). (Notably, a year built (YB) is typically available data, and homes with a year built (YB) < or =30 years of age may be used as research has shown that the life cycle for most asphalt composition shingles is less than the designated 30 year period). Thus, an assumption may be made that a current roof is the original roof. (Notably, an automated confirmation protocol may be incorporated to review if a policy for a particular building location has had a prior wind or hail claim that warranted a complete roof replacement (i.e., If yes, an updated Roof Year (RY) may be used)); and 3) a final formula for determining roof age may include a calculated roof age (CRA)=data extraction date (DED)−roof year (RY). For example, if the data extraction date (DED) was year-end 2017 and the roof year (RY) was 2003, the calculated roof age (CRA) is equal to 14 years.

Figure 3:
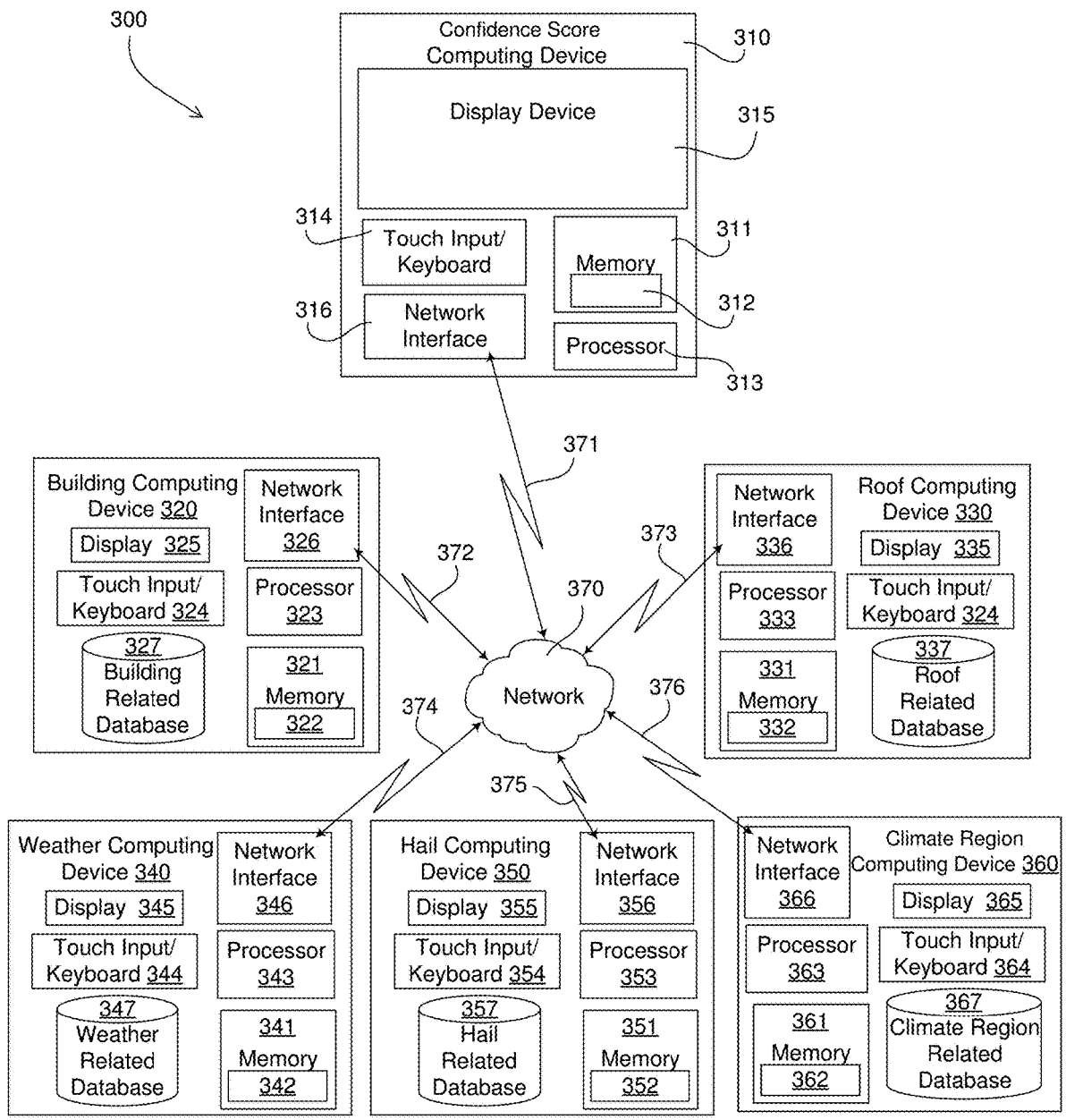
FIG. 3 depicts a block diagram of an example computer system related to property insurance.

Turning to FIG. 3, a computer system related to property insurance 300 may include, for example, a confidence score computing device 310, a building computing device 320, a roof computing device 330, a weather computing device 340, a hail computing device 350, and a climate zone computing device 360 communicatively connected to one another via a communications network 370. For clarity, only one confidence score computing device 310, one building computing device 320, one roof computing device 330, one weather computing device 340, one hail computing device 350, and one climate zone computing device 360 are depicted in FIG. 3. While only one confidence score computing device 310, one building computing device 320, one roof computing device 330, one weather computing device 340, one hail computing device 350, and one climate zone computing device 360 are depicted in FIG. 3, it should be understood that any number of confidence score computing devices 310, building computing devices 320, roof computing devices 330, weather computing devices 340, hail computing devices 350, and climate zone computing devices 360 may be supported within the system 300.

The confidence score computing device 310 may include a memory 311 and a processor 313 for storing and executing, respectively, a module 312. The module 312 may be, for example, stored on the memory 311 as a set of computer-readable instructions that, when executed by the processor 313, may cause the processor 313 to generate a base-line probable roof loss confidence score data, generate property insurance underwriting data, generate probable roof loss confidence score data, generate property insurance claims data, and generate property loss mitigation data. The confidence score computing device 310 may include a touch input/keyboard 314, a display device 315, and a network interface 316 configured to facilitate communications between the confidence score computing device 310, the building computing device 320, the roof computing device 330, the weather computing device 340, the hail computing device 350, and the climate zone computing device 360 via any hardwired or wireless communication network link 371, including for example a wireless LAN, MAN or WAN, WiFi, a wireless cellular telephone network, an Internet connection, or any combination thereof. Moreover, the confidence score computing device 310 may be communicatively connected to the building computing device 320, the roof computing device 330, the weather computing device 340, the hail computing device 350, and the climate zone computing device 360 via any suitable communication system, such as via any publicly available or privately owned communication network, including those that use wireless communication structures, such as wireless communication networks, including for example, wireless LANs and WANs, satellite and cellular telephone communication systems, etc.

The building computing device 320 may include a memory 321 and a processor 323 for storing and executing, respectively, a module 322. The module 322 may be, for example, stored on the memory 321 as a set of computer-readable instructions that, when executed by the processor 323, may cause the processor 323 to provide building data. The building computing device 320 may include a touch input/keyboard 324, a display device 325, and a network interface 326 configured to facilitate communications between the building computing device 320, the confidence score computing device 310, the roof computing device 330, the weather computing device 340, the hail computing device 350, and the climate zone computing device 360 via any hardwired or wireless communication network link 372, including for example a wireless LAN, MAN or WAN, WiFi, a wireless cellular telephone network, an Internet connection, or any combination thereof. Moreover, the building computing device 320 may be communicatively connected to the confidence score computing device 310, the roof computing device 330, the weather computing device 340, the hail computing device 350, and the climate zone computing device 360 via any suitable communication system, such as via any publicly available or privately owned communication network, including those that use wireless communication structures, such as wireless communication networks, including for example, wireless LANs and WANs, satellite and cellular telephone communication systems, etc.

The roof computing device 330 may include a memory 331 and a processor 333 for storing and executing, respectively, a module 332. The module 332 may be, for example, stored on the memory 331 as a set of computer-readable instructions that, when executed by the processor 333, may cause the processor 333 to generate provide roof data. The roof computing device 330 may include a touch input/keyboard 334, a display device 335, and a network interface 336 configured to facilitate communications between the confidence roof device 330, the building computing device 320, the confidence score computing device 310, the weather computing device 340, the hail computing device 350, and the climate zone computing device 360 via any hardwired or wireless communication network link 373, including for example a wireless LAN, MAN or WAN, WiFi, a wireless cellular telephone network, an Internet connection, or any combination thereof. Moreover, the roof computing device 330 may be communicatively connected to the building computing device 320, the confidence score computing device 310, the weather computing device 340, the hail computing device 350, and the climate zone computing device 360 via any suitable communication system, such as via any publicly available or privately owned communication network, including those that use wireless communication structures, such as wireless communication networks, including for example, wireless LANs and WANs, satellite and cellular telephone communication systems, etc.

The weather computing device 340 may include a memory 341 and a processor 343 for storing and executing, respectively, a module 342. The module 342 may be, for example, stored on the memory 341 as a set of computer-readable instructions that, when executed by the processor 343, may cause the processor 343 to provide weather data. The weather computing device 340 may include a touch input/keyboard 344, a display device 345, and a network interface 346 configured to facilitate communications between the weather computing device 340, the building computing device 320, the roof computing device 330, the confidence score computing device 310, the hail computing device 350, and the climate zone computing device 360 via any hardwired or wireless communication network link 374, including for example a wireless LAN, MAN or WAN, WiFi, a wireless cellular telephone network, an Internet connection, or any combination thereof. Moreover, the weather computing device 340 may be communicatively connected to the building computing device 320, the roof computing device 330, the confidence score computing device 310, the hail computing device 350, and the climate zone computing device 360 via any suitable communication system, such as via any publicly available or privately owned communication network, including those that use wireless communication structures, such as wireless communication networks, including for example, wireless LANs and WANs, satellite and cellular telephone communication systems, etc.

The hail computing device 350 may include a memory 351 and a processor 353 for storing and executing, respectively, a module 352. The module 352 may be, for example, stored on the memory 351 as a set of computer-readable instructions that, when executed by the processor 353, may cause the processor 353 to provide hail data. The hail computing device 350 may include a touch input/keyboard 354, a display device 355, and a network interface 356 configured to facilitate communications between the hail computing device 350, the building computing device 320, the roof computing device 330, the weather computing device 340, the confidence score computing device 310, and the climate zone computing device 360 via any hardwired or wireless communication network link 375, including for example a wireless LAN, MAN or WAN, WiFi, a wireless cellular telephone network, an Internet connection, or any combination thereof. Moreover, the hail computing device 350 may be communicatively connected to the building computing device 320, the roof computing device 330, the weather computing device 340, the confidence score computing device 310, and the climate zone computing device 360 via any suitable communication system, such as via any publicly available or privately owned communication network, including those that use wireless communication structures, such as wireless communication networks, including for example, wireless LANs and WANs, satellite and cellular telephone communication systems, etc.

The climate zone computing device 360 may include a memory 361 and a processor 363 for storing and executing, respectively, a module 362. The module 362 may be, for example, stored on the memory 361 as a set of computer-readable instructions that, when executed by the processor 363, may cause the processor 363 to provide climate zone data. The climate zone computing device 360 may include a touch input/keyboard 364, a display device 365, and a network interface 366 configured to facilitate communications between the climate zone computing device 360, the building computing device 320, the roof computing device 330, the weather computing device 340, the hail computing device 350, and the confidence score computing device 310 via any hardwired or wireless communication network link 376, including for example a wireless LAN, MAN or WAN, WiFi, a wireless cellular telephone network, an Internet connection, or any combination thereof. Moreover, the climate zone computing device 360 may be communicatively connected to the building computing device 320, the roof computing device 330, the weather computing device 340, the hail computing device 350, and the confidence score computing device 310 via any suitable communication system, such as via any publicly available or privately owned communication network, including those that use wireless communication structures, such as wireless communication networks, including for example, wireless LANs and WANs, satellite and cellular telephone communication systems, etc.

By distributing the memory/data and processing among the confidence score computing devices 310, the building computing devices 320, the roof computing devices 330, the weather computing devices 340, the hail computing devices 350, and the climate zone computing devices 360, the overall capabilities of the system 300 may be optimized. Furthermore, the individual data sources (e.g., the building data, the roof data, the weather data, the hail data, and the climate zone data) may be updated and maintained by different entities. Therefore, updating and maintain the associated data is more efficient and secure.

Figure 4A:
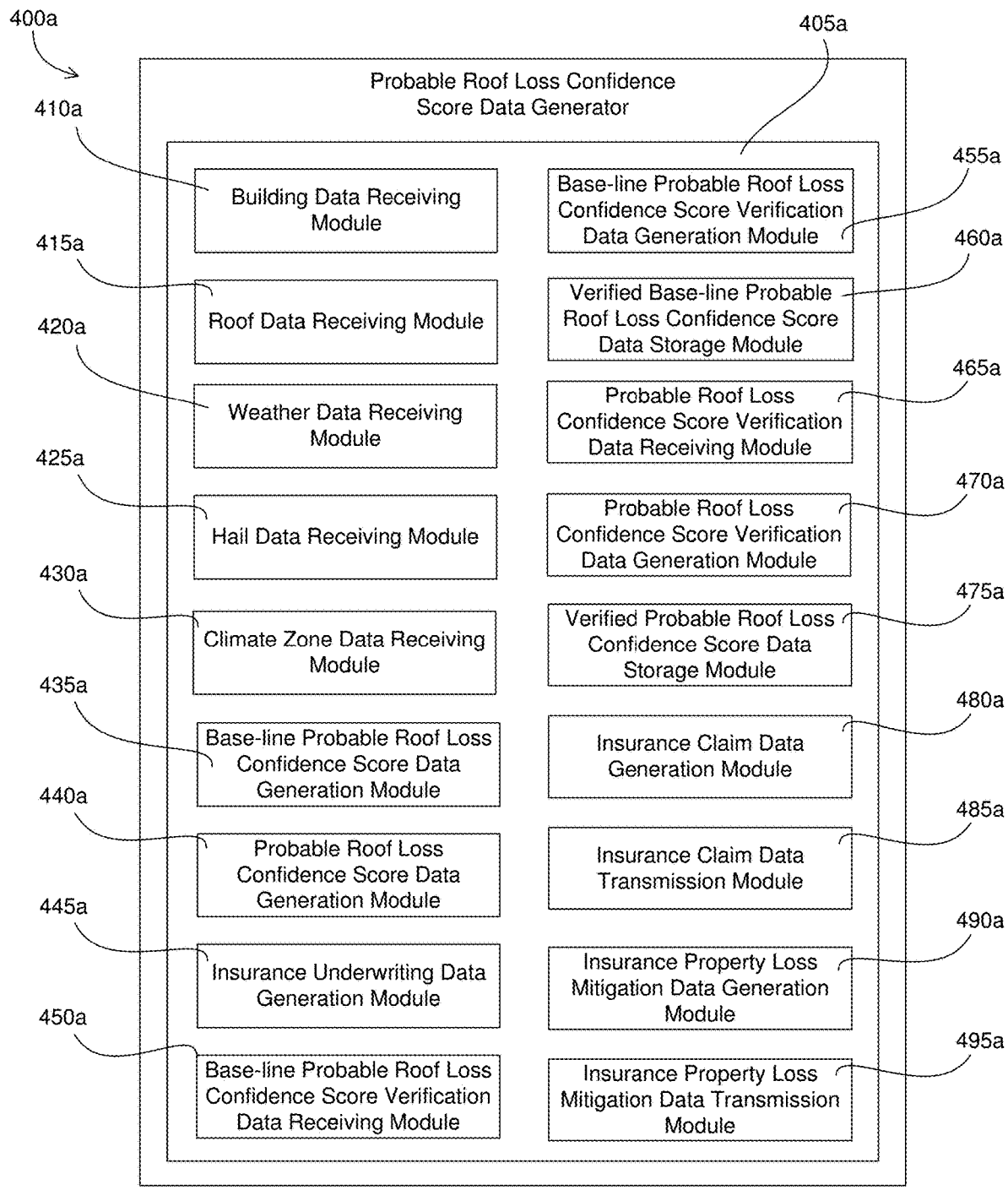
FIG. 4A depicts a block diagram of an example probable roof loss confidence score computing device.

With reference to FIG. 4A, a probable roof loss confidence score computing device 400a may include a building data receiving module 410a, a roof data receiving module 415a, a weather data receiving module 420a, a hail data receiving module 425a, a climate zone data receiving module 430a, a base-line probable roof loss confidence score data generation module 435a, a probable roof loss confidence score data generation module 440a, an insurance underwriting data generation module 445a, a base-line probable roof loss confidence score verification data receiving module 450a, a base-line probable roof loss confidence score verification data generation module 455a, a verified base-line probable roof loss confidence score data storage module 460a, a probable roof loss confidence score verification data receiving module 465a, a probable roof loss confidence score verification data generation module 470a, a verified probable roof loss confidence score data storage module 475a, an insurance claim data generation module 480a, an insurance claim data transmission module 485a, an insurance property loss mitigation data generation module 490a, and an insurance property loss mitigation data transmission module 495a stored on, for example, a memory 405a as a set of computer-readable instructions. The probable roof loss confidence score computing device 400a may be similar to, for example, the confidence score computing device 310 of FIG. 3.

Figure 4B:
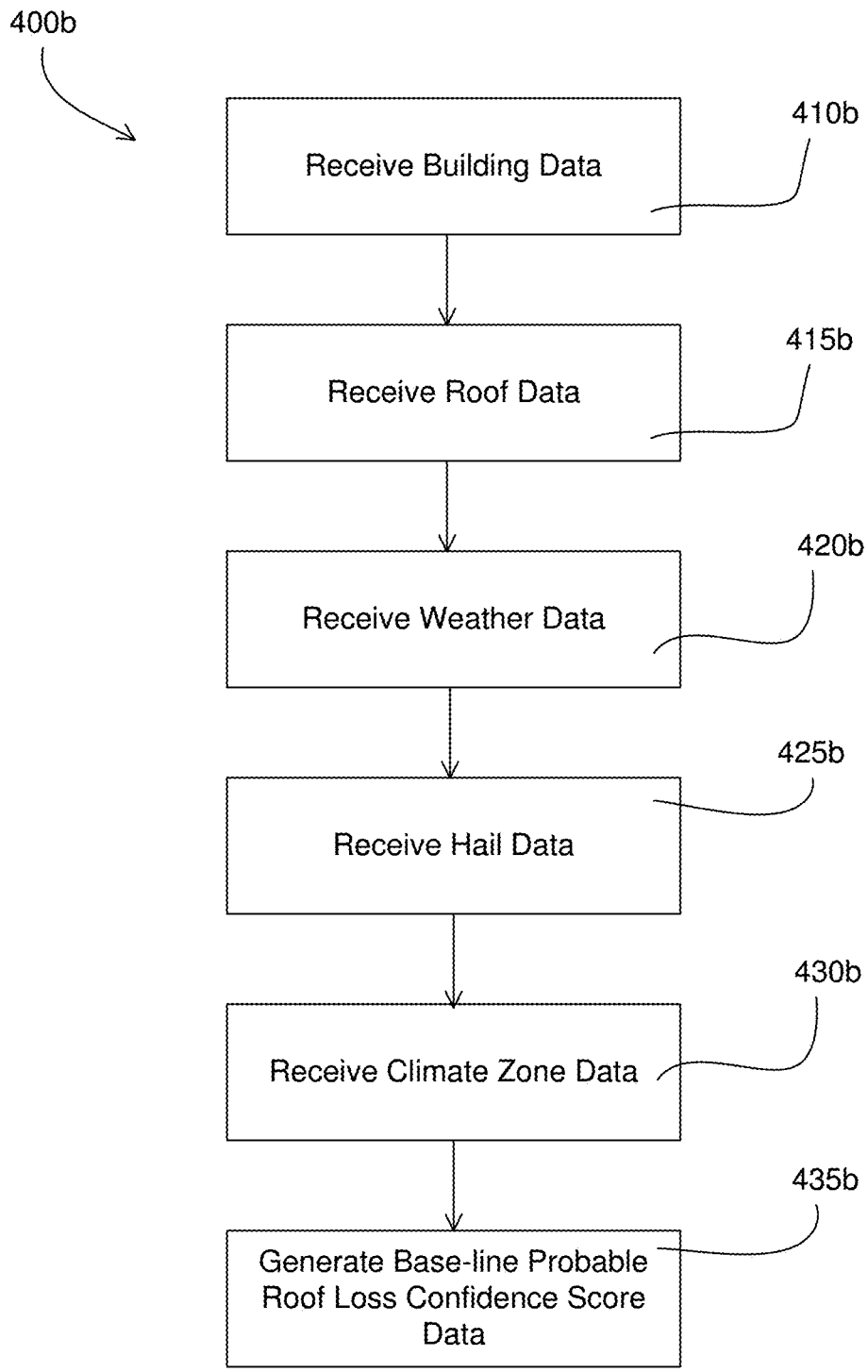
FIG. 4B depicts an example method of generating a base-line probable roof loss confidence score.

Turning to FIG. 4B, a method of generating a base-line probable roof loss confidence score 400b may be implemented by a processor (e.g., processor 313 of FIG. 3) executing, for example, at least a portion of the modules 410a-495a of FIG. 4A or the module 312 of FIG. 3. In particular, the processor 313 may execute the building data receiving module 410a to cause the processor 313 to, for example, receive building data from a building computing device 320 (block 410b). The building data may be representative of attributes of the building. Attributes of the building include at least one of: a geographic location of the building, a building orientation relative to geographic cardinal directions, whether the building is single story, whether the building is two story, whether the building is multi-story, whether there is tree cover over the building, location and height of structures surrounding the building, or elevation of terrain surrounding the building.

The processor 313 may execute the roof data receiving module 415a to cause the processor 313 to, for example, receive roof data from a roof computing device 430 based on the building data (block 415b). The roof data may be representative of the roofing system covering the building. Alternatively, or additionally, the roof data may be representative of a structural truss system that forms the design and shape of the roof. Furthermore, the roof data may be representative of the roof sheathing, underlayment, roofing felt, membrane, self-adhered water and ice-dam protection membrane, tar, tar paper, exterior roofing material covering, roof vents, flashing and drip edges, and any other component comprising part of the overall roof surface covering of the building. The roof data may be representative of at least one of: a roofing product age, roof area, a roofing material type, a roofing design, a roofing configuration, a roofing product condition, whether a roof is a gable roof, whether a roof is a hip roof, a roof slope, a number of layers of roofing material, a roof deck condition, a roofing manufacturer product testing result, a roofing installation criteria, a roofing product impact testing result, a roofing product wind testing result, a roofing installation, whether a roofing product complies with a particular roof impact test standard or protocol, whether the roofing product is impact resistant rated, a roofing product impact resistance rating, a roofing product wind rating, a roofing shingle specification, whether a roofing product was installed during cold conditions with hand-sealed roofing cement, a roof underlayment, a roofing facer technology, a polyiso roofing insulation, an EPS insulation, whether a roof includes roof ventilation, an attic detail, a roofing product manufacture warranty, a roofing product installer warranty, or a roofing product third-party warranty.

The processor 313 may execute the weather data receiving module 420a to cause the processor 313 to, for example, receive historical weather data from a weather computing device 340 based on the building data (block 420b). The historical weather data may be representative of storm attributes associated with historical storms that have occurred in a geographic area that includes a geographic location of the building. The attributes of the storm may include at least one of: a storm meteorological signature, a storm duration, a storm direction, thermal shock, whether a storm is conducive to producing damaging hail, whether a storm is conducive to producing strong winds, key meteorological aspects of a storm, length of time that the storm impacted the roof, a direction from which the storm impacts the building, a roof temperature prior to the storm, a roof temperature after the storm, or a thermal shock to roofing material.

The processor 313 may execute a hail data receiving module 425a to cause the processor 313 to, for example, receive historical hail data from a hail computing device based on the building data (block 425b). The historical hail data may be representative of attributes of historical hail that has impacted a geographic area that includes the geographic location of the building. Attributes of the hail may include at least one of: a physical characteristic of the hail, a size of the hail, a shape of the hail, a density of the hail, a hardness of the hail, a range of hail sizes produced by a storm, or a resistance to flexing of the hail.

The processor 313 may execute the climate region data receiving module 430a to cause the processor 313 to, for example, receive climate region data from a climate zone computing device 360 based on the building data (block 430b). The climate zone data may be representative of at least one of: a climate associated with a geographic location of the building; a humidity associated with a geographic location of the building, a temperature associated with a geographic location of the building, a moisture associated with a geographic location of the building, or whether a geographic location of the building is associated with a marine climate.

The processor 313 may execute the base-line probable roof loss confidence score data generation module 435a to cause the processor 313 to, for example, generate base-line probable roof loss confidence score data based on the building data, the roof data, the weather data, the hail data, and the climate region data (block 435b). Execution of the base-line probable roof loss confidence score data generation module 435a may cause the processor 313 to implement a probability function to generate the base-line probable roof loss confidence score data (block 435b). A contribution of a first term of the probability function may be weighted, via a first weighting variable, relative to a second term of the probability function. The first term of the probability function may be based on the roof data. The second term of the probability function may be based on the hail data. The first weighting variable may be dynamically determined based on at least one of: the building data, the roof data, the weather data, the hail data, or the climate region data. For example, if an associated building is located within a climate zone that does not experience hail, the hail data may be associated with a weighting variable of zero.

Figure 4C:
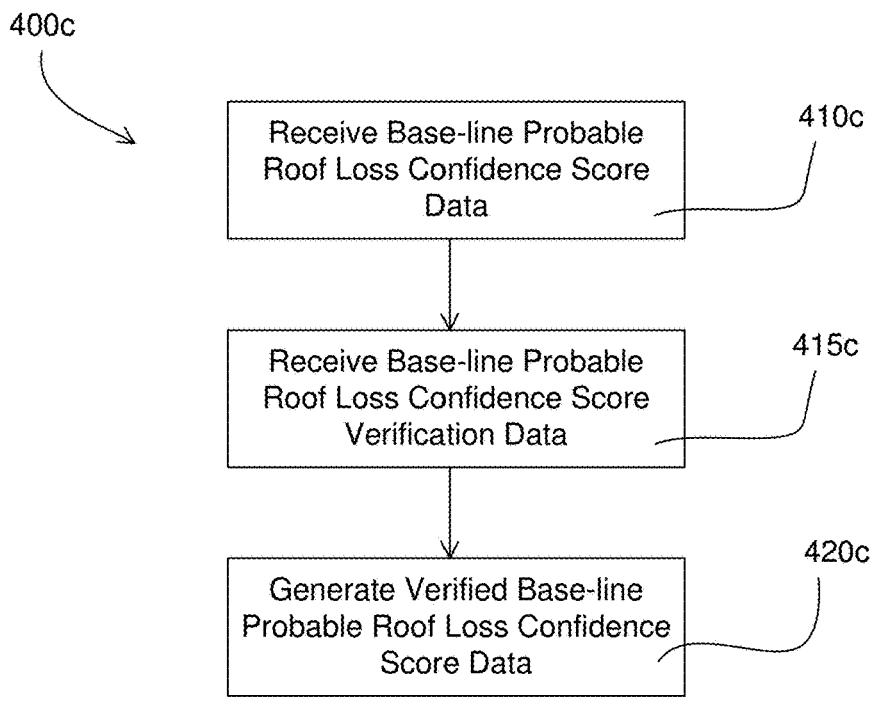
FIG. 4C depicts an example method of generating verified base-line probable roof loss confidence score data.

With reference to FIG. 4C, a method of generating verified base-line probable roof loss confidence score data 400c may be implemented by a processor (e.g., processor 313 of FIG. 3) executing, for example, at least a portion of the modules 410a-495a of FIG. 4A or the module 312 of FIG. 3. In particular, the processor 313 may receive the base-line probable roof loss confidence score data from block 435b (block 410c).

The processor 313 may execute the base-line probable roof loss confidence score verification data receiving module 450a to cause the processor 313 to, for example, receive base-line probable roof loss confidence score verification data (block 415c). The base-line probable roof loss confidence score verification data may be, for example, any of the variables (i.e., data) included in Table 1 below, and may be received from any one of the data sources included in Table 1. Alternatively, or additionally the probable roof loss confidence score verification data may be manually entered.

The processor 313 may execute the base-line probable roof loss confidence score verification data generation module 455a to cause the processor 313 to, for example, generate verified base-line probable roof loss confidence score data based on a comparison of the base-line probable roof loss confidence score data with the base-line probable roof loss confidence score verification data (block 420c).

The processor 313 may execute the verified base-line probable roof loss confidence score data storage module 460a to cause the processor 313 to, for example, store the base-line probable roof loss confidence score data in, for example, the memory 311 if the processor 313 determines that the base-line probable roof loss confidence score data matches the base-line probable roof loss confidence score verification data (block 420c). Alternatively, the processor 313 may store the verified base-line probable roof loss confidence score data in, for example, the memory 311 if the processor 313 determines that the base-line probable roof loss confidence score data does not match the base-line probable roof loss confidence score verification data (block 420c).

TABLE 1

| Item | Variable | Data Source |
|---|---|---|
| A | Storm Signature (Meteorological) | Weather Vendor |
| B | Storm Duration | Weather Vendor |
| C | Storm Direction | Weather Vendor |
| D | Thermal Shock | Weather Vendor |
| E | Hail Size | Weather Vendor |
| F | Hail Shape | Claim File, Homeowner, Crowd Sourcing |
| G | Hail Density | Weather Vendor |
| H | Hail Hardness | Weather Vendor |
| I | Roofing Product Age | Policy Master Record, Year Built Basis, Claim Reason Codes (Total Roof Loss) |
| J | Roof Area | Policy Master Record, Real Property Vendor, or other vendor |
| K | Roofing Material Type | Policy Master Record, Claim Record, Real Property Vendor or other vendor |
| L | Roofing Design (Configuration) | Real Property Vendor or other vendor |
| M | Roof Slope | Real Property Vendor or other vendor |
| N | No. of Layers of Roofing | a Real Property Vendor, vendor Inspection or other vendor inspection, Claim Inspection |
| O | Roof Deck Condition | a Real Property Vendor, vendor Inspection, Claim |

TABLE 1-continued

| Item | Variable | Data Source |
|---|---|---|
| P | Roofing Impact Testing Rating | Inspection Policy Master Record (IRR Credit) |
| Q | Roofing Wind Testing Rating | Manufacturer Reference Material |
| R | Roof Proper Installation (Yes/No) | a Real Property Vendor, vendor Inspection, Claim Inspection |
| S | Climate Region | Pacific Northwest National Laboratory-U.S. Department of Energy's Building America Program |
| T | Physical Structure (Single Story, Two Story, Bi-Level) | Policy Master Record |
| U | On-Sight (Tree Cover Present) | a Real Property Vendor, vendor Inspection or other vendor inspection, Claim Inspection |

Figure 4D:
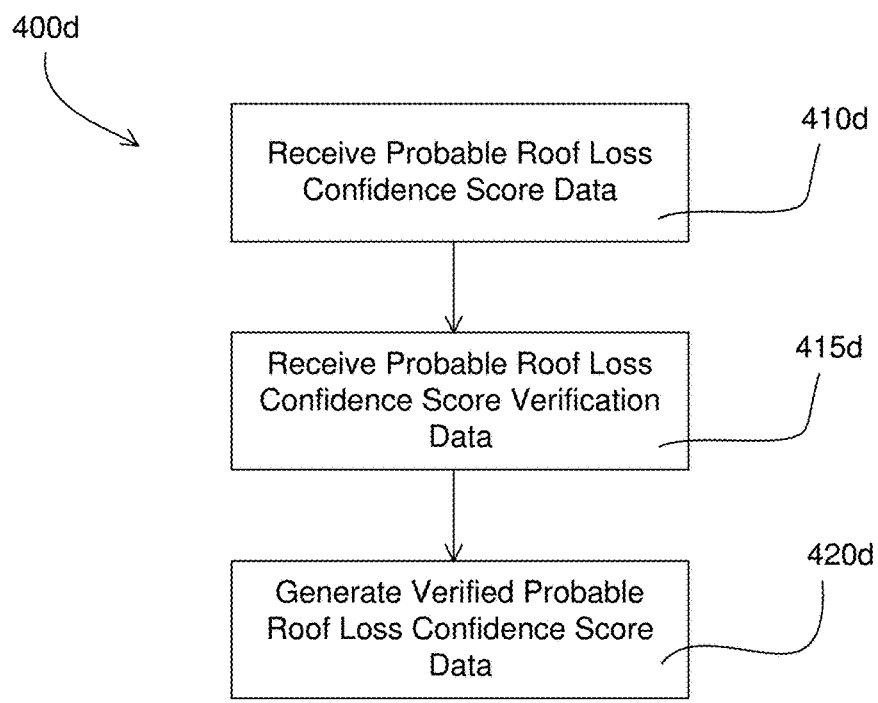
FIG. 4D depicts an example method of generating verified probable roof loss confidence score data.

Turning to FIG. 4D, a method of generating verified probable roof loss confidence score data 400*d* may be implemented by a processor (e.g., processor 313 of FIG. 3) executing, for example, at least a portion of the modules 410*a*-495*a* of FIG. 4A or the module 312 of FIG. 3. In particular, the processor 313 may receive the probable roof loss confidence score data from block 425*f* (block 410*d*).

The processor 313 may execute the probable roof loss confidence score verification data receiving module 465*a* to cause the processor 313 to, for example, receive probable roof loss confidence score verification data (block 415*d*). The probable roof loss confidence score verification data may be, for example, any of the variables (i.e., data) included in Table 1, and may be received from any one of the data sources included in Table 1. Alternatively, or additionally the probable roof loss confidence score verification data may be manually entered.

The processor 313 may execute the probable roof loss confidence score verification data generation module 470*a* to cause the processor 313 to, for example, generate verified probable roof loss confidence score data based on a comparison of the probable roof loss confidence score data with the probable roof loss confidence score verification data (block 420*d*).

The processor 313 may execute the verified probable roof loss confidence score data storage module 475*a* to cause the processor 313 to, for example, store the probable roof loss confidence score data in, for example, the memory 311 if the processor 313 determines that the probable roof loss confidence score data matches the probable roof loss confidence score verification data (block 420*d*). Alternatively, the processor 313 may store the verified probable roof loss confidence score data in, for example, the memory 311 if the processor 313 determines that the probable roof loss confidence score data does not match the probable roof loss confidence score verification data (block 420*d*).

Figure 4E:
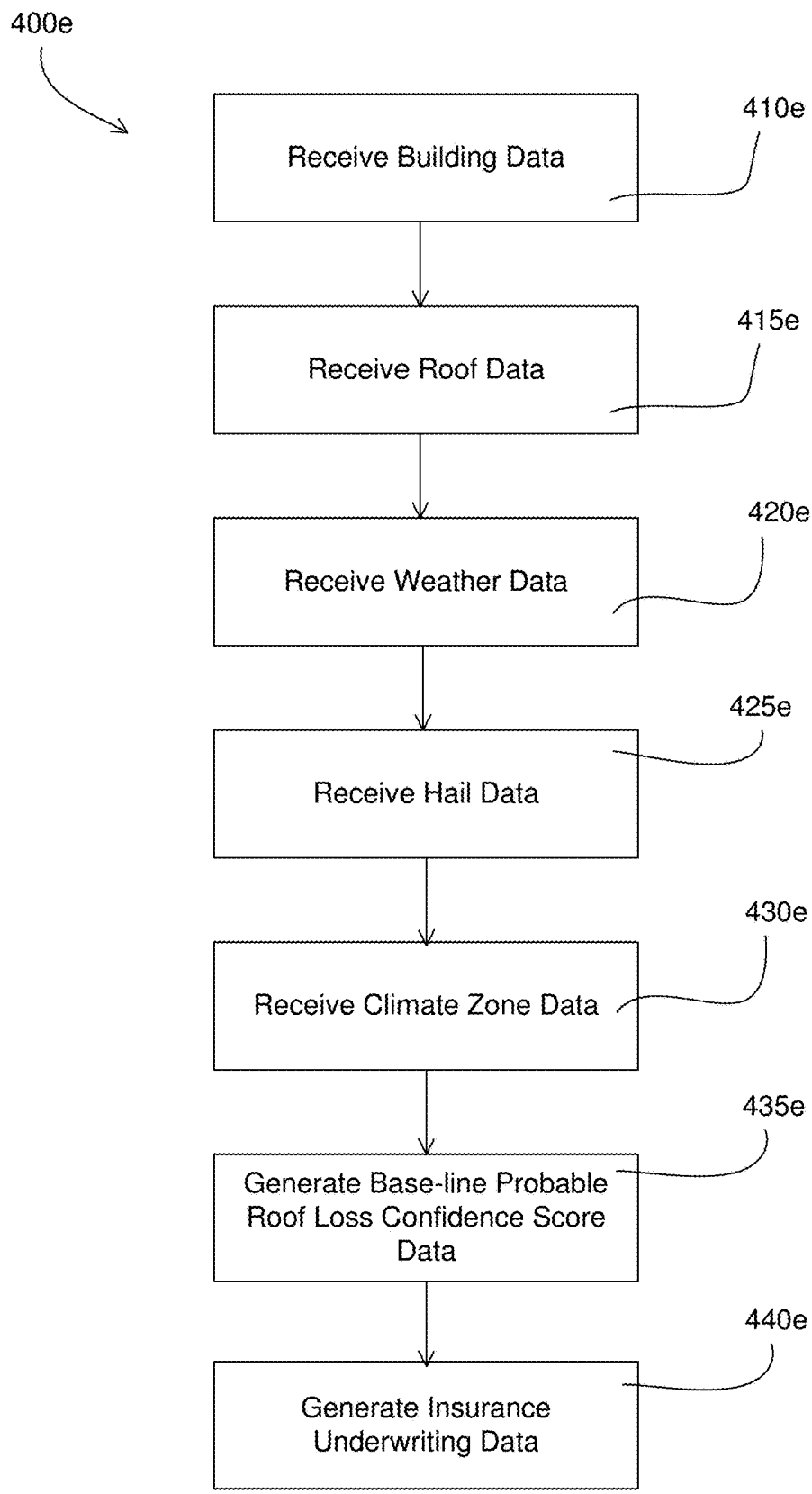
FIG. 4E depicts an example method of generating property insurance underwriting data based on base-line probable roof loss confidence score data.

With reference to FIG. 4E, a method of generating property insurance underwriting data based on base-line probable roof loss confidence score data 400*e* may be implemented by a processor (e.g., processor 313 of FIG. 3) executing, for example, at least a portion of the modules 410*a*-495*a* of FIG. 4A or the module 312 of FIG. 3. In particular, the processor 313 may execute the building data receiving module 410*a* to cause the processor 313 to, for example, receive building data from a building computing device 320 (block 410*e*). The building data may be representative of attributes of the building. Attributes of the building include at least one of: a geographic location of the building, a building orientation relative to geographic cardinal directions, whether the building is single story, whether the building is two story, whether the building is multi-story, whether there is tree cover over the building, location and height of structures surrounding the building, or elevation of terrain surrounding the building.

The processor 313 may execute the roof data receiving module 415*a* to cause the processor 313 to, for example, receive roof data from a roof computing device 430 based on the building data (block 415*e*). The roof data may be representative of a structure forming an upper covering of the building. The roof data may be representative of the roofing system covering the building. Alternatively, or additionally, the roof data may be representative of a structural truss system that forms the design and shape of the roof. Furthermore, the roof data may be representative of the roof sheathing, underlayment, roofing felt, membrane, self-adhered water and ice-dam protection membrane, tar, tar paper, exterior roofing material covering, roof vents, flashing and drip edges, and any other component comprising part of the overall roof surface covering of the building. The roof data may be representative of at least one of: a roofing product age, roof area, a roofing material type, a roofing design, a roofing configuration, a roofing product condition, whether a roof is a gable roof, whether a roof is a hip roof, a roof slope, a number of layers of roofing material, a roof deck condition, a roofing manufacturer product testing result, a roofing installation criteria, a roofing product impact testing result, a roofing product wind testing result, a roofing installation, whether a roofing product complies with a particular roof impact test standard or protocol, whether the roofing product is impact resistant rated, a roofing product impact resistance rating, a roofing product wind rating, a roofing shingle specification, whether a roofing product was installed during cold conditions with hand-sealed roofing cement, a roof underlayment, a roofing facer technology, a polyiso roofing insulation, an EPS insulation, whether a roof includes roof ventilation, an attic detail, a roofing product manufacture warranty, a roofing product installer warranty, or a roofing product third-party warranty.

The processor 313 may execute the weather data receiving module 420*a* to cause the processor 313 to, for example, receive historical weather data from a weather computing device 340 based on the building data (block 420*e*). The historical weather data may be representative of storm attributes associated with historical storms that have occurred in a geographic area that includes a geographic location of the building. The attributes of the storm may include at least one of: a storm meteorological signature, a storm duration, a storm direction, thermal shock, whether a storm is conducive to producing damaging hail, whether a storm is conducive to producing strong winds, key meteorological aspects of a storm, length of time that the storm impacted the roof, a direction from which the storm impacts the building, a roof temperature prior to the storm, a roof temperature after the storm, or a thermal shock to roofing material.

The processor 313 may execute a hail data receiving module 425a to cause the processor 313 to, for example, receive historical hail data from a hail computing device based on the building data (block 425e). The historical hail data may be representative of attributes of historical hail that has impacted a geographic area that includes the geographic location of the building. Attributes of the hail may include at least one of: a physical characteristic of the hail, a size of the hail, a shape of the hail, a density of the hail, a hardness of the hail, a range of hail sizes produced by a storm, or a resistance to flexing of the hail.

The processor 313 may execute the climate region data receiving module 430a to cause the processor 313 to, for example, receive climate region data from a climate zone computing device 360 based on the building data (block 430e). The climate zone data may be representative of at least one of: a climate associated with a geographic location of the building; a humidity associated with a geographic location of the building, a temperature associated with a geographic location of the building, a moisture associated with a geographic location of the building, or whether a geographic location of the building is associated with a marine climate.

The processor 313 may execute the base-line probable roof loss confidence score data generation module 435a to cause the processor 313 to, for example, generate base-line probable roof loss confidence score data based on the building data, the roof data, the weather data, the hail data, and the climate region data (block 435e). Execution of the base-line probable roof loss confidence score data generation module 435a may cause the processor 313 to implement a probability function to generate the base-line probable roof loss confidence score data (block 435e). A contribution of a first term of the probability function may be weighted, via a first weighting variable, relative to a second term of the probability function. The first term of the probability function may be based on the roof data. The second term of the probability function may be based on the hail data. The first weighting variable may be dynamically determined based on at least one of: the building data, the roof data, the weather data, the hail data, or the climate region data. For example, if an associated building is located within a climate zone that does not experience hail, the hail data may be associated with a weighting variable of zero.

The processor 313 may execute the insurance underwriting data generation module 445a to cause the processor 313 to, for example, generate insurance underwriting data based on the base-line probable roof loss confidence score data (block 440e).

Figure 4F:
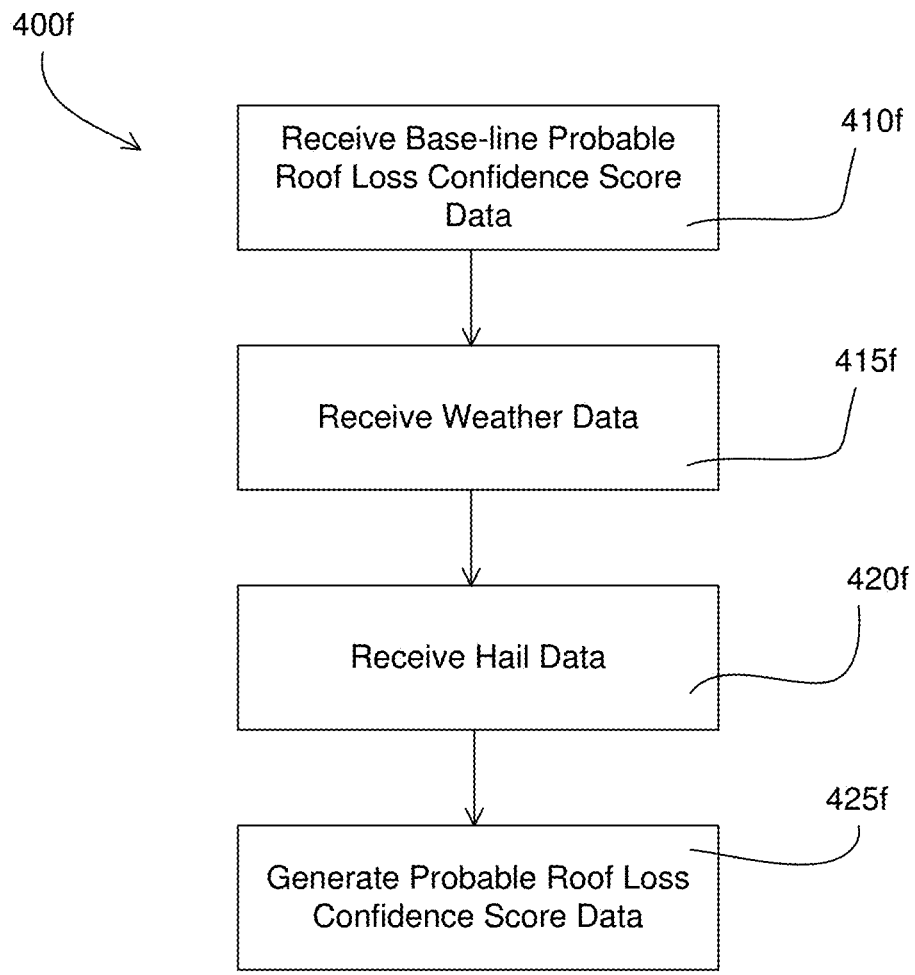
FIG. 4F depicts an example method of generating a probable roof loss confidence score.

Turning to FIG. 4F, a method of generating a probable roof loss confidence score 400f may be implemented by a processor (e.g., processor 313 of FIG. 3) executing, for example, at least a portion of the modules 410a-495a of FIG. 4A or the module 312 of FIG. 3. In particular, the processor 313 may receive the base-line probable roof loss confidence score data from block 435b (block 410f). The processor 313 may execute the weather data receiving module 420a to cause the processor 313 to, for example, receive weather data from a weather computing device 340 (block 415f). The weather data may be representative of storm attributes associated with storms that have recently occurred in a geographic area that includes a geographic location of the building. The attributes of the storm may include at least one of: a storm meteorological signature, a storm duration, a storm direction, thermal shock, whether a storm is conducive to producing damaging hail, whether a storm is conducive to producing strong winds, key meteorological aspects of a storm, length of time that the storm impacted the roof, a direction from which the storm impacts the building, a roof temperature prior to the storm, a roof temperature after the storm, or a thermal shock to roofing material.

The processor 313 may execute a hail data receiving module 425a to cause the processor 313 to, for example, receive hail data from a hail computing device based on the building data (block 420f). The hail data may be representative of attributes of hail that has recently impacted a geographic area that includes the geographic location of the building. Attributes of the hail may include at least one of: a physical characteristic of the hail, a size of the hail, a shape of the hail, a density of the hail, a hardness of the hail, a range of hail sizes produced by a storm, or a resistance to flexing of the hail.

The processor 313 may execute a probable roof loss confidence score data generation module 440a to cause the processor 313 to, for example, generate probable roof loss confidence score data based on the base-line probable roof loss confidence score data, the weather data, and the hail data (block 425f). Execution of the probable roof loss confidence score data generation module 440a may cause the processor 313 to implement a probability function to generate the base-line probable roof loss confidence score data (block 425f). A contribution of a first term of the probability function may be weighted, via a first weighting variable, relative to a second term of the probability function. The first term of the probability function may be based on the roof data. The second term of the probability function may be based on the hail data. The first weighting variable may be dynamically determined based on at least one of: the base-line probable roof loss confidence score data, the weather data, or the hail data. For example, if an associated building is located within a climate zone that does not experience hail, the hail data may be associated with a weighting variable of zero.

The probable roof loss confidence score data may be, for example, representative of a binary value (i.e., either a roof of the building is determine to be a total loss, or not). Alternatively, the probable roof loss confidence score data may be, for example, representative of a continuous value (i.e., a probability of the roof of the building being a total loss is determine). If the probability is less than some value (e.g., 50%), a manual verification of a roof loss claim may be performed. If the probability is greater than some value (e.g., 50%), the processor may automatically process an associated roof loss claim.

Figure 4G:
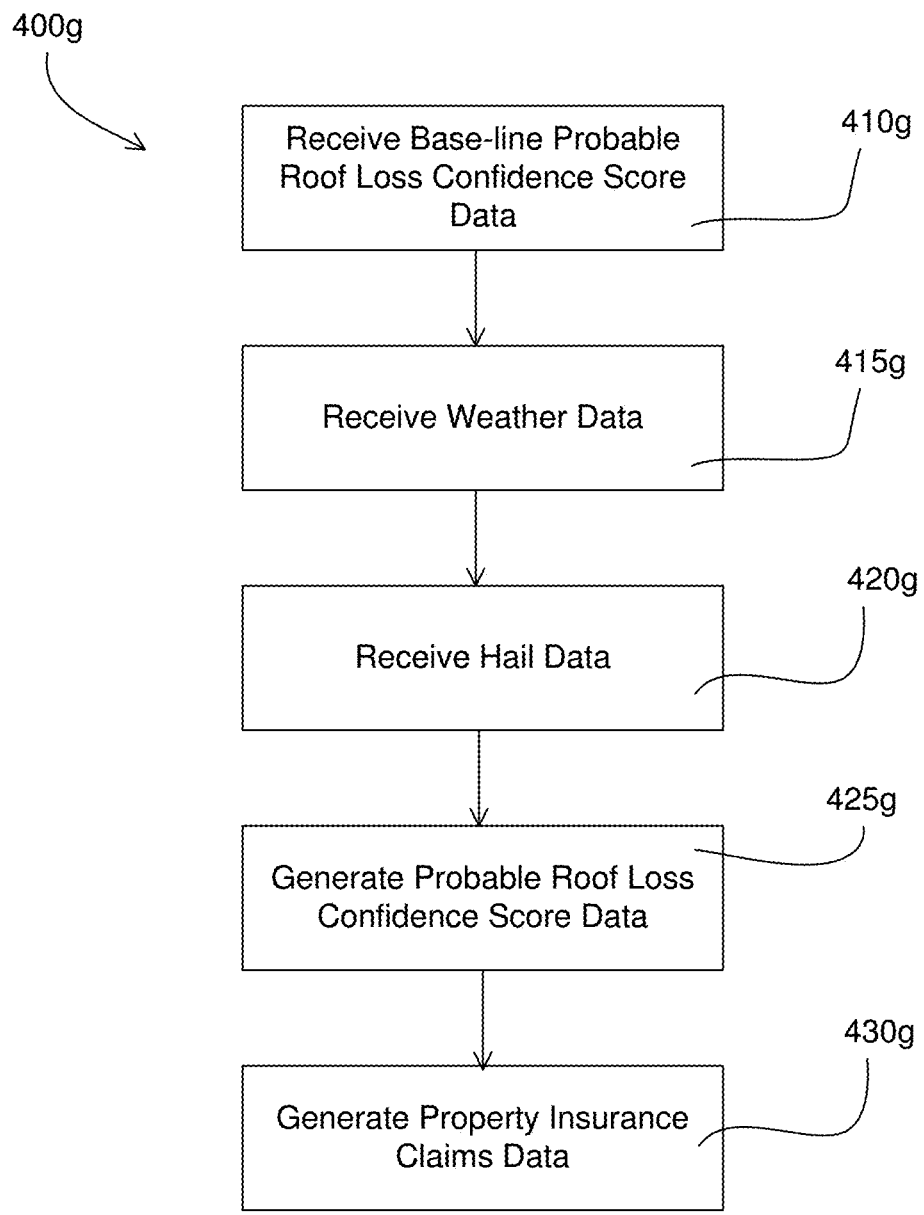
FIG. 4G depicts an example method of generating property insurance claims data based on probable roof loss confidence score data.

With reference to FIG. 4G, a method of generating property insurance claims data based on probable roof loss confidence score data 400g may implemented by a processor (e.g., processor 313 of FIG. 3) executing, for example, at least a portion of the modules 410a-495a of FIG. 4A or the module 312 of FIG. 3. In particular, the processor 313 may receive the base-line probable roof loss confidence score data from block 435b (block 410g). The processor 313 may execute the weather data receiving module 420a to cause the processor 313 to, for example, receive weather data from a weather computing device 340 (block 415g). The weather data may be representative of storm attributes associated with storms that have recently occurred in a geographic area that includes a geographic location of the building. The attributes of the storm may include at least one of: a storm meteorological signature, a storm duration, a storm direction, thermal shock, whether a storm is conducive to producing damaging hail, whether a storm is conducive to producing strong winds, key meteorological aspects of a storm, length of time that the storm impacted the roof, a direction from which the storm impacts the building, a roof temperature prior to the storm, a roof temperature after the storm, or a thermal shock to roofing material.

The processor 313 may execute a hail data receiving module 425a to cause the processor 313 to, for example, receive hail data from a hail computing device based on the building data (block 420g). The hail data may be representative of attributes of hail that has recently impacted a geographic area that includes the geographic location of the building. Attributes of the hail may include at least one of: a physical characteristic of the hail, a size of the hail, a shape of the hail, a density of the hail, a hardness of the hail, a range of hail sizes produced by a storm, or a resistance to flexing of the hail.

The processor 313 may execute a probable roof loss confidence score data generation module 440a to cause the processor 313 to, for example, generate probable roof loss confidence score data based on the base-line probable roof loss confidence score data, the weather data, and the hail data (block 425g). Execution of the probable roof loss confidence score data generation module 440a may cause the processor 313 to implement a probability function to generate the base-line probable roof loss confidence score data (block 425g). A contribution of a first term of the probability function may be weighted, via a first weighting variable, relative to a second term of the probability function. The first term of the probability function may be based on the roof data. The second term of the probability function may be based on the hail data. The first weighting variable may be dynamically determined based on at least one of: the base-line probable roof loss confidence score data, the weather data, or the hail data. For example, if an associated building is located within a climate zone that does not experience hail, the hail data may be associated with a weighting variable of zero.

The processor 313 may execute an insurance claim data generation module 480a to cause the processor 313 to, for example, generate insurance claim data based on the probable roof loss confidence score data (block 430g). The probable roof loss confidence score data may be, for example, representative of a binary value (i.e., either a roof of the building is determine to be a total loss, or not). Alternatively, the probable roof loss confidence score data may be, for example, representative of a continuous value (i.e., a probability of the roof of the building being a total loss is determine). If the probability is less than some value (e.g., 50%), a manual verification of a roof loss claim may be performed. If the probability is greater than some value (e.g., 50%), the processor may automatically process an associated roof loss claim.

The processor 313 may execute an insurance claim data transmission module 485a to cause the processor 313 to, for example, settle an insurance claim (block 430g). For example, the processor 313 may cause a notification to be sent to an insurance adjustor, or may cause a payment to be automatically transmitted to a building owner or a repair vendor.

Figure 4H:
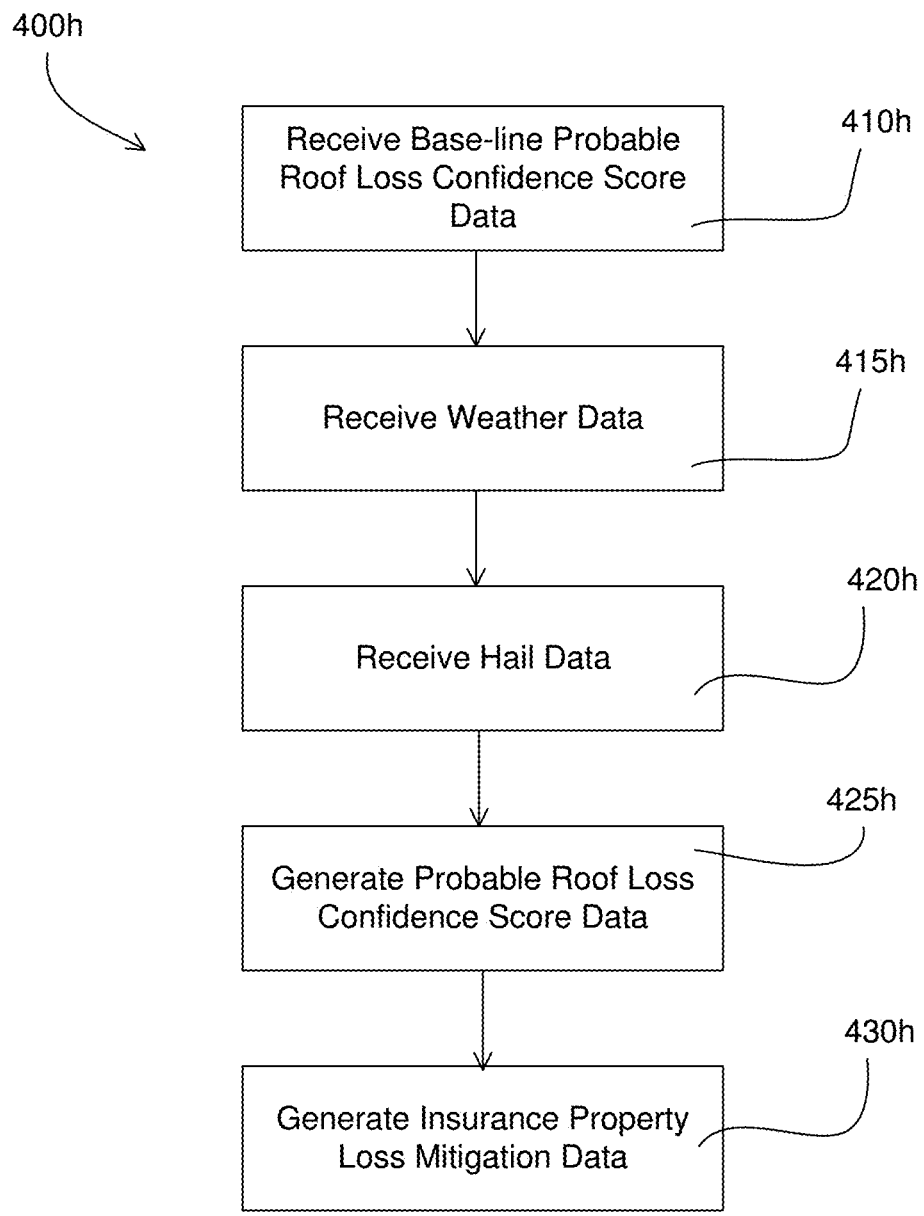
FIG. 4H depicts an example method of generating insurance property loss mitigation data based on probable roof loss confidence score data.

Turning to FIG. 4H, a method of generating insurance property loss mitigation data based on probable roof loss confidence score data 400h may be implemented by a processor (e.g., processor 313 of FIG. 3) executing, for example, at least a portion of the modules 410a-495a of FIG. 4A or the module 312 of FIG. 3. In particular, the processor 313 may receive the base-line probable roof loss confidence score data from block 435b (block 410h). The processor 313 may execute the weather data receiving module 420a to cause the processor 313 to, for example, receive weather data from a weather computing device 340 (block 415h). The weather data may be representative of storm attributes associated with storms that have recently occurred in a geographic area that includes a geographic location of the building. The attributes of the storm may include at least one of: a storm meteorological signature, a storm duration, a storm direction, thermal shock, whether a storm is conducive to producing damaging hail, whether a storm is conducive to producing strong winds, key meteorological aspects of a storm, length of time that the storm impacted the roof, a direction from which the storm impacts the building, a roof temperature prior to the storm, a roof temperature after the storm, or a thermal shock to roofing material.

The processor 313 may execute a hail data receiving module 425a to cause the processor 313 to, for example, receive hail data from a hail computing device based on the building data (block 420h). The hail data may be representative of attributes of hail that has recently impacted a geographic area that includes the geographic location of the building. Attributes of the hail may include at least one of: a physical characteristic of the hail, a size of the hail, a shape of the hail, a density of the hail, a hardness of the hail, a range of hail sizes produced by a storm, or a resistance to flexing of the hail.

The processor 313 may execute a probable roof loss confidence score data generation module 440a to cause the processor 313 to, for example, generate probable roof loss confidence score data based on the base-line probable roof loss confidence score data, the weather data, and the hail data (block 425h). Execution of the probable roof loss confidence score data generation module 440a may cause the processor 313 to implement a probability function to generate the base-line probable roof loss confidence score data (block 425h). A contribution of a first term of the probability function may be weighted, via a first weighting variable, relative to a second term of the probability function. The first term of the probability function may be based on the roof data. The second term of the probability function may be based on the hail data. The first weighting variable may be dynamically determined based on at least one of: the base-line probable roof loss confidence score data, the weather data, or the hail data. For example, if an associated building is located within a climate zone that does not experience hail, the hail data may be associated with a weighting variable of zero.

The processor 313 may execute an insurance property loss mitigation data generation module 490a to cause the processor 313 to, for example, generate insurance claim data based on the probable roof loss confidence score data (block 430h). The probable roof loss confidence score data may be, for example, representative of a binary value (i.e., either a roof of the building is determine to be a total loss, or not). Alternatively, the probable roof loss confidence score data may be, for example, representative of a continuous value (i.e., a probability of the roof of the building being a total loss is determine). If the probability is less than some value (e.g., 50%), a manual verification of a roof loss claim may be performed. If the probability is greater than some value (e.g., 50%), the processor may automatically process an associated roof loss claim.

The processor 313 may execute an insurance property loss mitigation data transmission module 495a to cause the processor 313 to, for example, mitigate property loss (block 430h). For example, the processor 313 may cause a notification to be sent to an insurance adjustor, or may cause a payment to be automatically transmitted to a repair vendor.

Figure 5A:
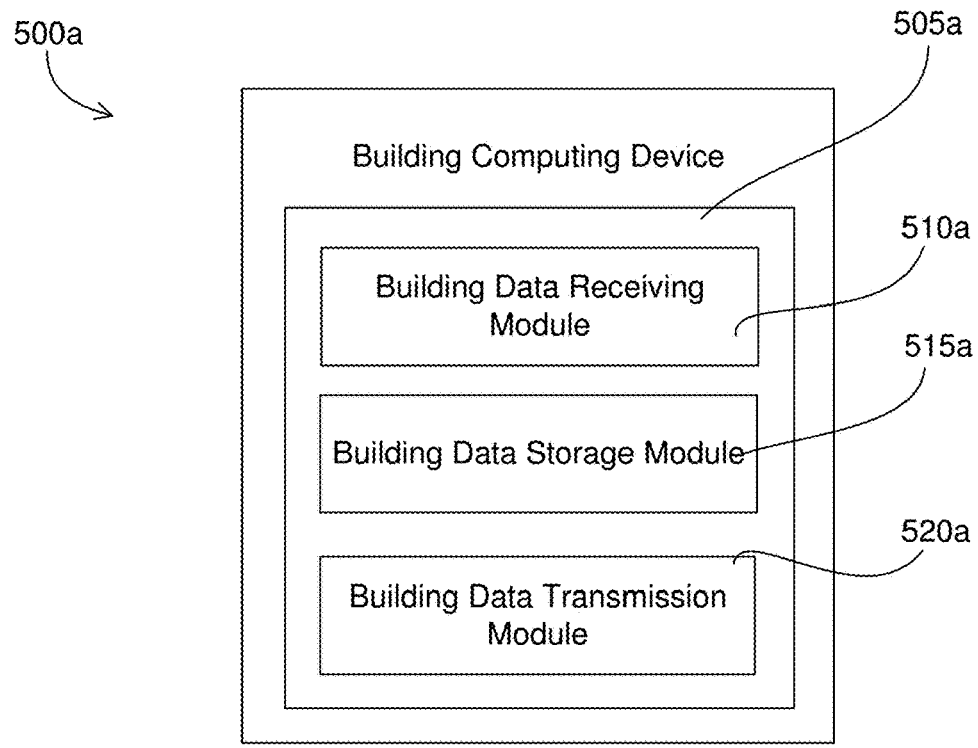
FIG. 5A depicts an example building computing device.

With reference to FIG. 5A, a building computing device 500a may include a building data receiving module 510a, a building data storage module 515a, and a building data transmission module 520a stored on, for example, a memory 505a as a set of computer-readable instructions. The building computing device 500a may be similar to, for example, the building computing device 320 of FIG. 3.

Figure 5B:
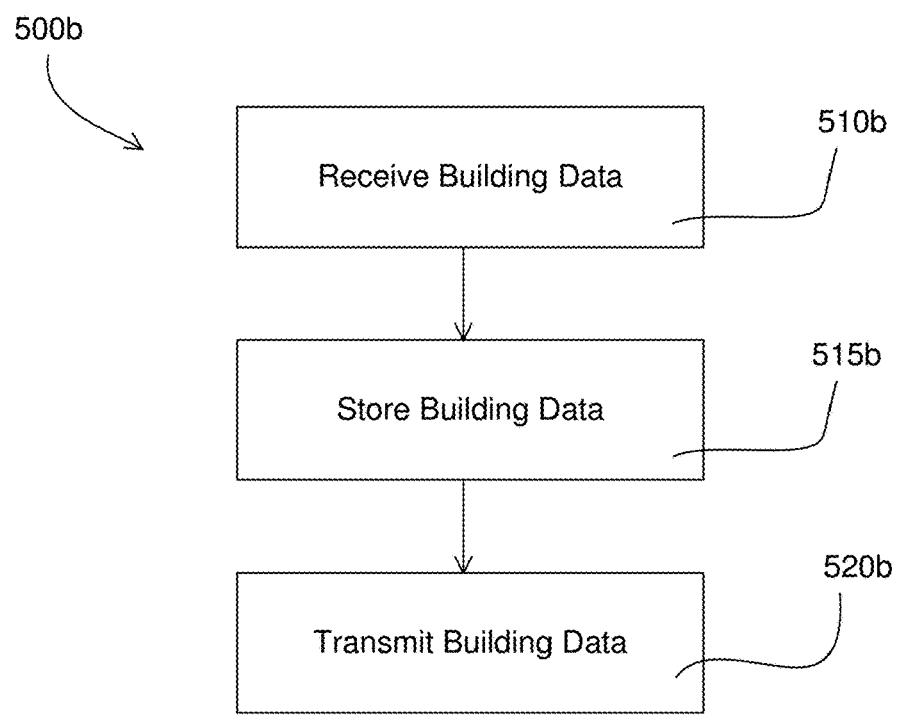
FIG. 5B depicts an example method of implementing a building computing device.

Turning to FIG. 5B, a method of implementing a building computing device 500b may be implemented by a processor (e.g., processor 323 of FIG. 3) executing, for example, at least a portion of the modules 510a-520a of FIG. 5A or the module 323 of FIG. 3. In particular, the processor 313 may execute the building data receiving module 510a to cause the processor 323 to, for example, receive building data from a building data source (block 510b). The building data source may be, for example, an insurance company policy master record, an insurance claim record, a real property vendor (e.g., an aerial image source, a real estate master listing source, etc.), an insurance claim file, a homeowner, crowd sourcing, or other vendor (e.g., an inspection vendor, a property inspection vendor, etc.).

At least one building data source may incorporate, for example, various internet of things (iOT) or "smart home" technology (e.g., data from video doorbells, data from security cameras, data from, etc.). The building data may include video data, photograph data, and/or audio data. The building data may include historical data for various purposes such as establishing a base-line for a particular property, or portion of a property (e.g., a roof, a building exterior, gutters, down spouts, exterior siding, exterior windows, etc.). Additionally, or alternatively, the building data may include real-time data collected at a time of an "event" (e.g., at a time of a hail storm, at a time of a wind storm, etc.).

The processor 323 may execute the building data storage module 515a to cause the processor 323 to, for example, analyze the building data, using any one of, or a collection of one or more of: a variety of automated techniques including machine learning, artificial intelligence or similar to derive insights for to enhance the accuracy of an associated probable roof loss confidence score. For example, a video doorbell or exterior security camera may detect an occurrence of hail proximate a respective building. The processor 323 may execute the building data receiving module 515a to cause the processor 323 to, for example, receive image data from a camera. The processor 323 may execute the building data storage module 515a to cause the processor 323 to, for example, estimate at least one characteristic, including but not limited to: direction of hail, size of hail, density/hardness, elevations of the structure exposed to hail, or duration of hail at the property location, based on the image data.

Likewise, audio data from similar devices, may be used for automated analysis to provide similar insights as described above. The processor 323 may execute the building data receiving module 510a to cause the processor 323 to, for example, receive audio data from at least one security microphone. The processor 323 may execute the building data storage module 515a to cause the processor 323 to, for example, detect an audio "signature" of hail that is impacting an associated building based on the audio data. The processor 323 may execute the building data transmission module 520a to cause the processor 323 to, for example, triggering event notifications to the property owner or other party that the property owner designates (e.g., an insurer, a property inspector, a property repairer, etc.) based on the audio data. The processor 323 may execute the building data storage module 515a to cause the processor 323 to, for example, estimate at least one characteristic, including: a direction of hail, size of hail, hardness, elevations of the structure exposed to hail, and/or duration of hail at the property location, based on the audio data.

The processor 323 may execute the building data storage module 515a to cause the processor 323 to, for example, store the building data (block 515b). The processor 323 may execute the building data transmission module 520a to cause the processor 323 to, for example, transmit the building data to a confidence score computing device 400a (block 520b).

Figure 6A:
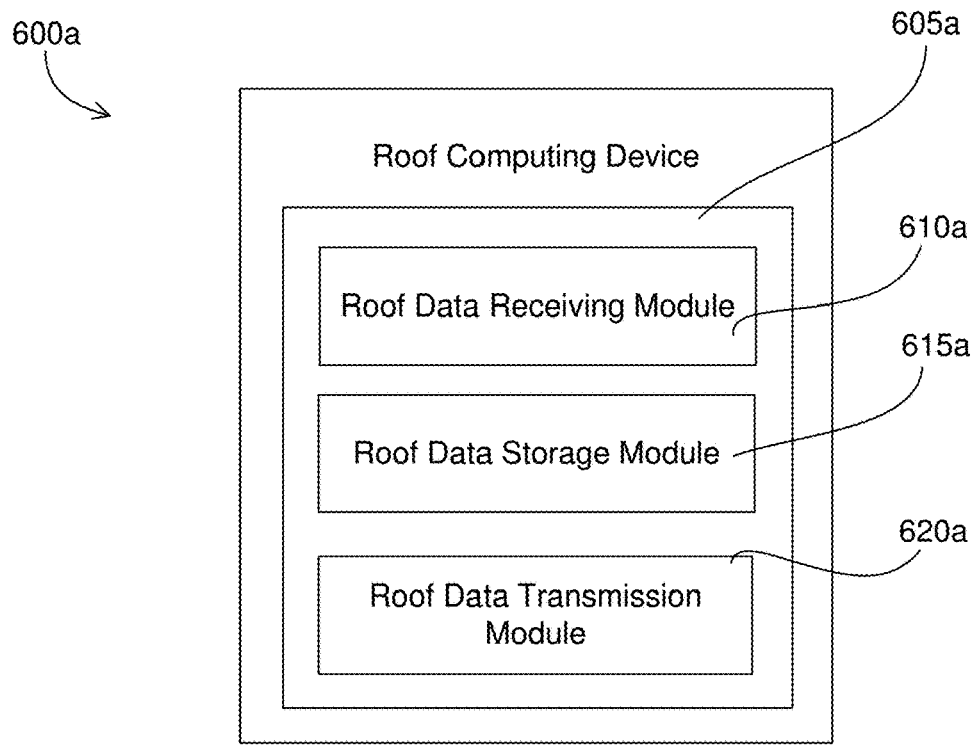
FIG. 6A depicts an example roof computing device.

With reference to FIG. 6A, a roof computing device 600a may include a roof data receiving module 610a, a roof data storage module 615a, and a roof data transmission module 620a stored on, for example, a memory 605a as a set of computer-readable instructions. The roof computing device 600a may be similar to, for example, the roof computing device 330 of FIG. 3.

Figure 6B:
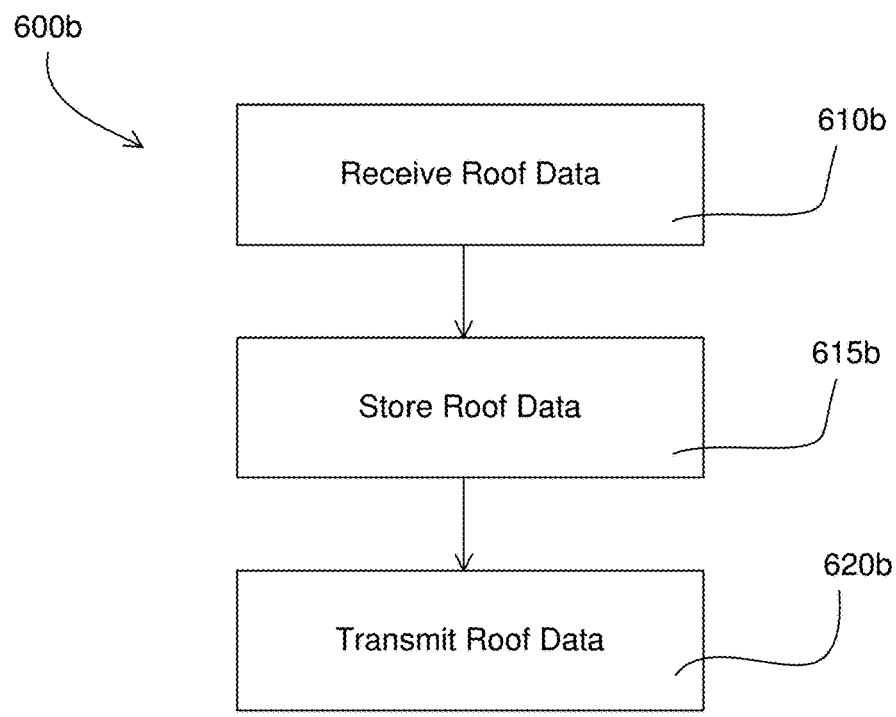
FIG. 6B depicts an example method of implementing a roof computing device.

Turning to FIG. 6B, a method of implementing a roof computing device 600b may be implemented by a processor (e.g., processor 333 of FIG. 3) executing, for example, at least a portion of the modules 610a-620a of FIG. 6A or the module 332 of FIG. 3. In particular, the processor 333 may execute the roof data receiving module 610a to cause the processor 323 to, for example, receive roof data from a roof data source (block 610b). The roof data source may be, for example, an insurance company policy master record, an insurance claim record, real property vendor, a roofing material manufacture, a roofing material installer, an insurance claim file, a homeowner, crowd sourcing, or other vendor (e.g., an inspection vendor, a property inspection vendor, etc.).

At least one roof data source may incorporate, for example, various internet of things (iOT) or "smart home" technology (e.g., data from video doorbells, data from security cameras, data from, etc.). The roof data may include video data, photograph data, and/or audio data. The roof data may include historical data for various purposes such as establishing a base-line for a particular property, or portion of a property (e.g., a roof, a building exterior, gutters, down spouts, exterior siding, exterior windows, etc.). Additionally, or alternatively, the roof data may include real-time data collected at a time of an "event" (e.g., at a time of a hail storm, at a time of a wind storm, etc.).

The processor 333 may execute the roof data storage module 615a to cause the processor 333 to, for example, analyze the image and/or audio data, using any one of, or a collection of one or more of: a variety of automated techniques including machine learning, artificial intelligence or similar to derive insights for to enhance the accuracy of an associated probable roof loss confidence score. For example, a video doorbell or exterior security camera may detect an occurrence of hail proximate a respective building. The processor 333 may execute the roof data receiving module 615a to cause the processor 333 to, for example, receive image data from a camera. The processor 333 may execute the roof data storage module 615a to cause the processor 333 to, for example, estimate at least one characteristic, including but not limited to: direction of hail, size of hail, density/hardness, elevations of the structure exposed to hail, or duration of hail at the property location, based on the image data.

Likewise, audio data from similar devices, may be used for automated analysis to provide similar insights as described above. The processor 333 may execute the roof data receiving module 610a to cause the processor 333 to, for example, receive audio data from at least one security microphone. The processor 333 may execute the roof data storage module 615a to cause the processor 333 to, for example, detect an audio "signature" of hail that is impacting an associated building, based on the audio data. The processor 333 may execute the roof data transmission module 620a to cause the processor 333 to, for example, triggering event notifications to the property owner or other party that the property owner designates (e.g., an insurer, a property inspector, a property repairer, etc.) based on the audio data. The processor 333 may execute the roof data storage module 615a to cause the processor 333 to, for example, estimate at least one characteristic, including: a direction of hail, size of hail, hardness, elevations of the structure exposed to hail, and/or duration of hail at the property location, based on the audio data.

The processor 333 may execute the roof data storage module 615a to cause the processor 333 to, for example, store the roof data (block 615b). The processor 333 may execute the roof data transmission module 620a to cause the processor 333 to, for example, transmit the roof data to a confidence score computing device 400a (block 620b).

Figure 7A:
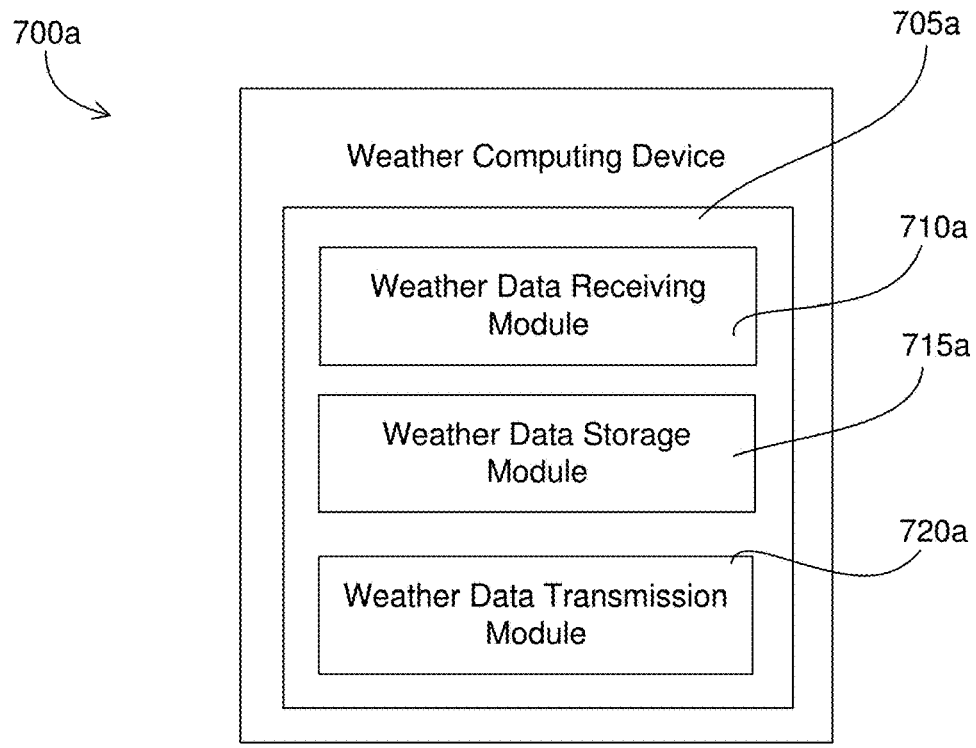
FIG. 7A depicts an example weather computing device.

With reference to FIG. 7A, a weather computing device 700a may include a weather data receiving module 710a, a weather data storage module 715a, and a weather data transmission module 620a stored on, for example, a memory 705a as a set of computer-readable instructions. The weather computing device 700a may be similar to, for example, the weather computing device 340 of FIG. 3.

Figure 7B:
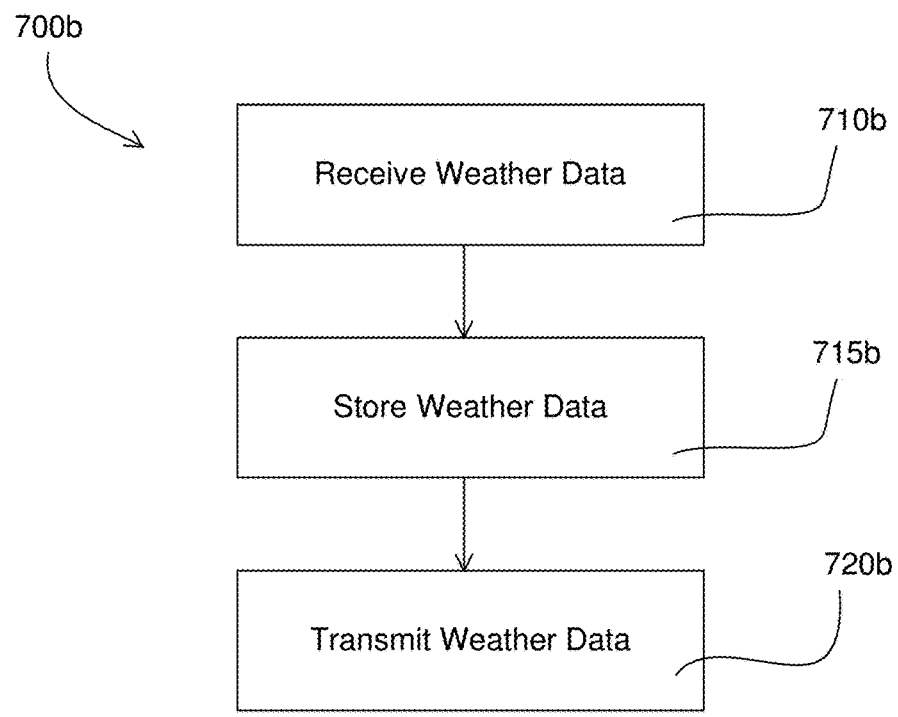
FIG. 7B depicts an example method of implementing a weather computing device.

Turning to FIG. 7B, a method of implementing a weather computing device 700b may be implemented by a processor (e.g., processor 343 of FIG. 3) executing, for example, at least a portion of the modules 710a-720a of FIG. 7A or the module 342 of FIG. 3. In particular, the processor 343 may execute the weather data receiving module 710a to cause the processor 343 to, for example, receive weather data from a weather data source (block 710b). The weather data source may be, for example, an insurance company policy master record, an insurance claim file, a homeowner, crowd sourcing, or the National Oceanic and Atmospheric Administration—U.S. Department of Commerce.

The processor 343 may execute the weather data storage module 715a to cause the processor 343 to, for example, store the weather data (block 715b). The processor 343 may execute the weather data transmission module 720a to cause the processor 343 to, for example, transmit the weather data to a confidence score computing device 400a (block 720b).

Figure 8A:
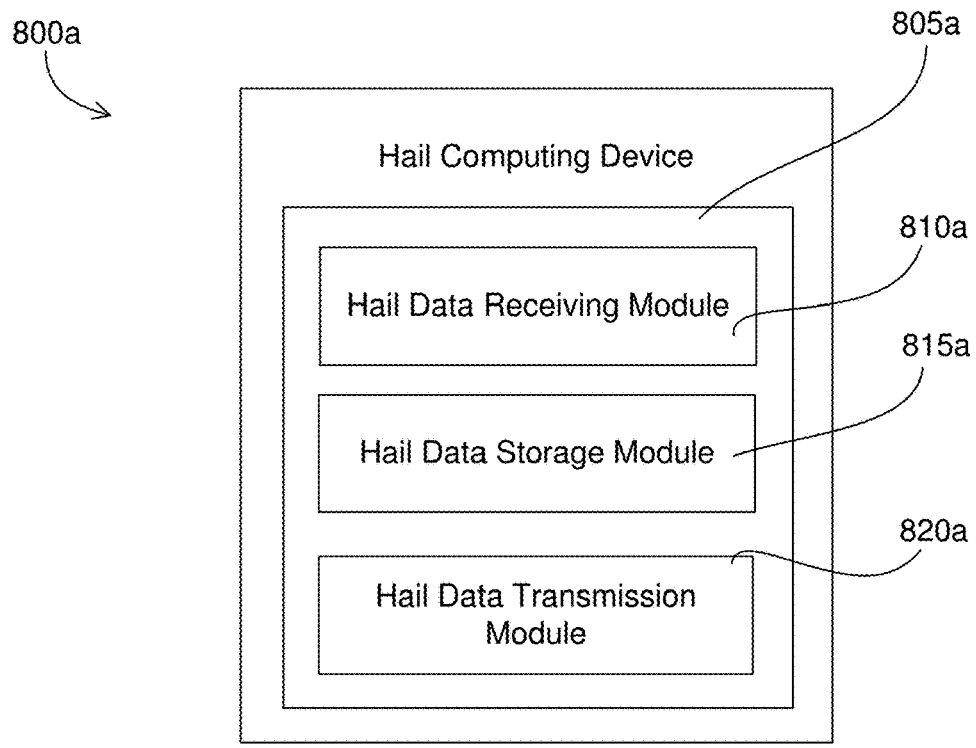
FIG. 8A depicts an example hail computing device.

With reference to FIG. 8A, a hail computing device 800a may include a hail data receiving module 810a, a hail data storage module 815a, and a hail data transmission module 820a stored on, for example, a memory 805a as a set of computer-readable instructions. The hail computing device 800a may be similar to, for example, the hail computing device 350 of FIG. 3.

Figure 8B:
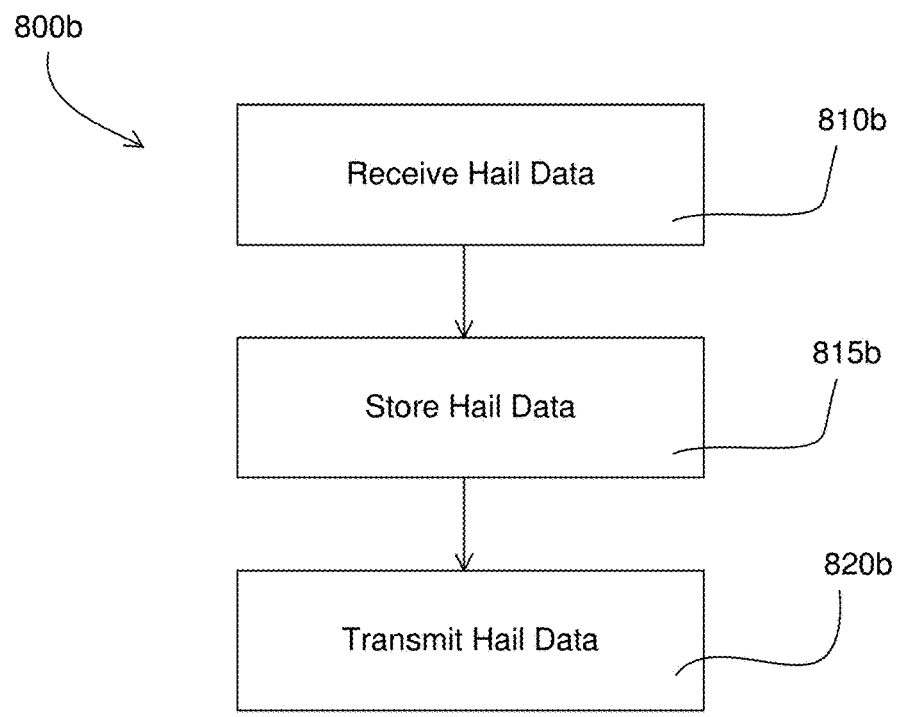
FIG. 8B depicts an example hail of implementing a building computing device.

Turning to FIG. 8B, a method of implementing a hail computing device 800b may be implemented by a processor (e.g., processor 353 of FIG. 3) executing, for example, at least a portion of the modules 810a-820a of FIG. 8A or the module 352 of FIG. 3. In particular, the processor 353 may execute the hail data receiving module 810a to cause the processor 353 to, for example, receive hail data from a hail data source (block 810b). The hail data source may be, for example, an insurance company policy master record, an insurance claim file, a homeowner, crowd sourcing, or the National Oceanic and Atmospheric Administration—U.S. Department of Commerce.

At least one hail data source may incorporate, for example, various internet of things (iOT) or "smart home" technology (e.g., data from video doorbells, data from security cameras, data from, etc.). The hail data may include video data, photograph data, image data, and/or audio data. The hail data may include historical data for various purposes such as establishing a base-line for a particular property, or portion of a property (e.g., a roof, a building exterior, gutters, down spouts, exterior siding, exterior windows, etc.). Additionally, or alternatively, the hail data may include real-time data collected at a time of an "event" (e.g., at a time of a hail storm, at a time of a wind storm, etc.).

The processor 353 may execute the hail data storage module 815a to cause the processor 353 to, for example, analyze image data and/or audio data, using any one of, or a collection of one or more of: a variety of automated techniques including machine learning, artificial intelligence or similar to derive insights for to enhance the accuracy of an associated probable roof loss confidence score. For example, a video doorbell or exterior security camera may detect an occurrence of hail proximate a respective building. The processor 353 may execute the hail data receiving module 815a to cause the processor 353 to, for example, receive image data from a camera. The processor 353 may execute the hail data storage module 815a to cause the processor 353 to, for example, estimate at least one characteristic, including but not limited to: direction of hail, size of hail, density/hardness, elevations of the structure exposed to hail, or duration of hail at the property location, based on the image data.

Likewise, audio data from similar devices, may be used for automated analysis to provide similar insights as described above. The processor 353 may execute the hail data receiving module 810a to cause the processor 353 to, for example, receive audio data from at least one security microphone. The processor 353 may execute the hail data storage module 815a to cause the processor 353 to, for example, detect an audio "signature" of hail that is impacting an associated building, based on the audio data. The processor 353 may execute the hail data transmission module 820a to cause the processor 353 to, for example, triggering event notifications to the property owner or other party that the property owner designates (e.g., an insurer, a property inspector, a property repairer, etc.) based on the audio data. The processor 353 may execute the hail data storage module 815a to cause the processor 353 to, for example, estimate at least one characteristic, including: a direction of hail, size of hail, hardness, elevations of the structure exposed to hail, and/or duration of hail at the property location, based on the audio data.

The processor 353 may execute the hail data storage module 815a to cause the processor 353 to, for example, store the hail data (block 815b). The processor 353 may execute the hail data transmission module 820a to cause the processor 353 to, for example, transmit the hail data to a confidence score computing device 400a (block 820b).

Figure 9A:
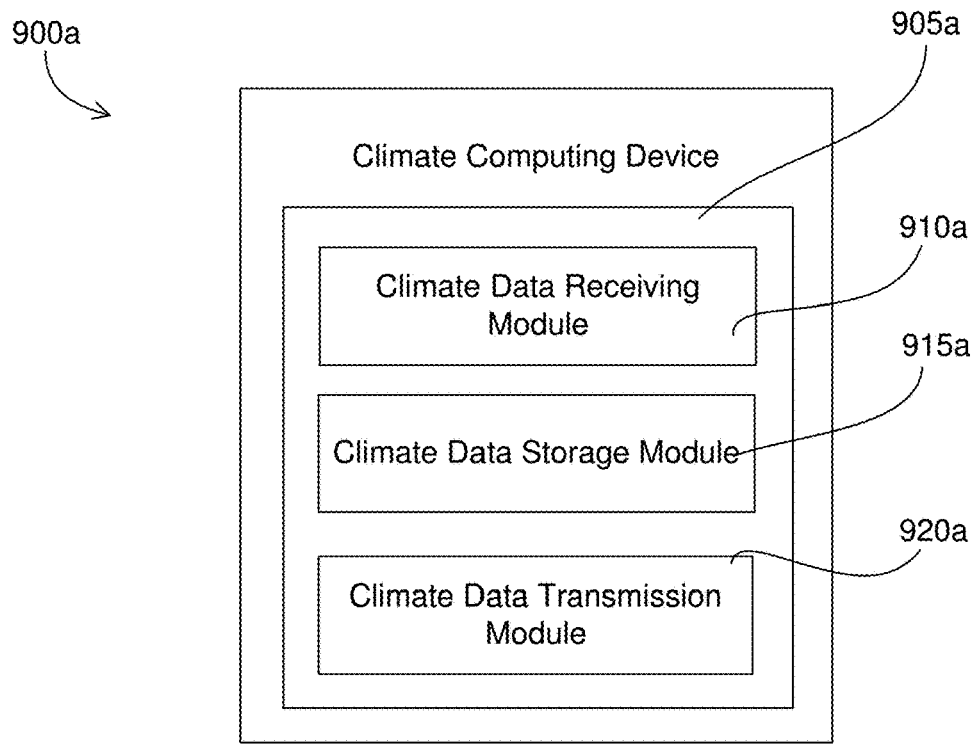
FIG. 9A depicts an example climate zone computing device.

With reference to FIG. 9A, a climate zone computing device 900a may include a climate zone data receiving module 910a, a climate zone data storage module 915a, and a climate zone data transmission module 920a stored on, for example, a memory 905a as a set of computer-readable instructions. The climate zone computing device 900a may be similar to, for example, the climate zone computing device 360 of FIG. 3.

Figure 9B:
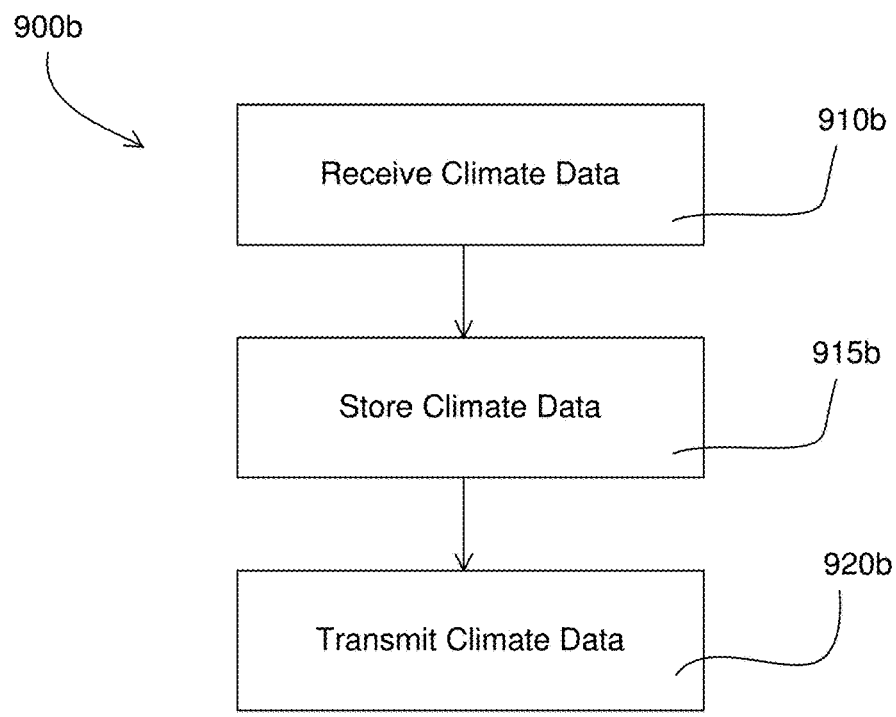
FIG. 9B depicts an example method of implementing a climate zone computing device.

Turning to FIG. 9B, a method of implementing a climate zone computing device 900b may be implemented by a processor (e.g., processor 363 of FIG. 3) executing, for example, at least a portion of the modules 910a-920a of FIG. 9A or the module 362 of FIG. 3. In particular, the processor 363 may execute the climate zone data receiving module 910a to cause the processor 363 to, for example, receive climate zone data from a climate zone data source (block 910b). The climate zone data source may be, for example, an insurance company policy master record, an insurance claim file, a homeowner, crowd sourcing, or Pacific Northwest National Laboratory—U.S. Department of Energy's Building America Program.

The processor 363 may execute the climate zone data storage module 915a to cause the processor 363 to, for example, store the climate zone data (block 915b). The processor 363 may execute the climate zone data transmission module 920a to cause the processor 363 to, for example, transmit the climate zone data to a confidence score computing device 400a (block 920b).

Aspects of the Invention

A system for generating a base-line probable roof loss confidence score associated with a roof of a building may include a building data receiving module stored on a memory of a confidence score computing device that, when executed by a processor of the confidence score computing device, may cause the processor of the confidence score computing device to receive building data from a building computing device. The building data may be representative of attributes of the building. The system may also include a roof data receiving module stored on the memory of the confidence score computing device that, when executed by the processor of the confidence score computing device, may cause the processor of the confidence score computing device to receive roof data from a roof computing device. The roof data may be representative of a structure forming an upper covering of the building. The system may further include a weather data receiving module stored on the memory of the confidence score computing device that, when executed by a processor of the confidence score computing device, may cause the processor of the confidence score computing device to receive historical weather data from a weather computing device based on the building data. The historical weather data may be representative of storm attributes associated with historical storms that have occurred in a geographic area that includes a geographic location of the building. The system may yet further include a hail data receiving module stored on the memory of the confidence score computing device that, when executed by the processor of the confidence score computing device, may cause the processor of the confidence score computing device to receive historical hail data from a hail computing device based on the building data. The historical hail data may be representative of attributes of historical hail that has impacted a geographic area that includes the geographic location of the building. The system may also include a base-line probable roof loss confidence score data generation module stored on the memory of the confidence score computing device that, when executed by the processor of the confidence score computing device, may cause the processor of the confidence score computing device to generate base-line probable roof loss confidence score data based on the building data, the roof data, the weather data, and the hail data.

The system may further include a climate region data receiving module stored on the memory of the confidence score computing device that, when executed by the processor of the confidence score computing device, may cause the processor of the confidence score computing device to receive climate region data from a climate region computing device based on the building data. The base-line probable roof loss confidence score data may be further based on the climate region data.

The system may yet further include a base-line probable roof loss confidence score verification data receiving module stored on the memory of the confidence score computing device that, when executed by the processor of the confidence score computing device, may cause the processor of the confidence score computing device to receive base-line probable roof loss confidence score verification data.

The system may include a verified base-line probable roof loss confidence score data generation module stored on the memory of the confidence score computing device that, when executed by the processor of the confidence score computing device, may cause the processor of the confidence score computing device to generate verified base-line probable roof loss confidence score data based on a comparison of the base-line probable roof loss confidence score data with the base-line probable roof loss confidence score verification data.

The system may include a verified base-line probable roof loss confidence score data storage module stored on the memory of the confidence score computing device that, when executed by the processor of the confidence score computing device, may cause the processor of the confidence score computing device to store the verified base-line probable roof loss confidence score data on the memory of the confidence score computing device.

A computer-implemented method for generating base-line probable roof loss confidence score data associated with a roof of a building may include receiving building data from a building computing device in response to a processor of a confidence score computing device executing a building data receiving module. The building data may be representative of attributes of the building. The method may also include receiving roof data from a roof computing device in response to the processor of the confidence score computing device executing a roof data receiving module. The roof data may be representative of a structure forming an upper covering of the building. The method may further include receiving historical weather data from a weather computing device based on the building data in response to the processor of the confidence score computing device executing a weather data receiving module. The historical weather data may be representative of storm attributes associated with historical storms that have occurred in a geographic area that includes a geographic location of the building. The method may yet further include receiving historical hail data from a hail computing device based on the building data in response to the processor of the confidence score computing device executing a hail data receiving module. The historical hail data may be representative of attributes of historical hail that has impacted a geographic area that includes the geographic location of the building. The method may include receiving climate region data from a climate region computing device based on the building data in response to the processor of the confidence score computing device executing a climate region data receiving module. The method may also include generating base-line probable roof loss confidence score data based on the building data, the roof data, the weather data, the hail data, and the climate region data in response to the processor of the confidence score computing device executing a base-line probable roof loss confidence score data generation module.

Execution of the base-line probable roof loss confidence score data generation module may cause the processor of the confidence score computing device to implement a probability function to generate the base-line probable roof loss confidence score data. A contribution of a first term of the probability function may be weighted, via a first weighting variable, relative to a second term of the probability function. The first term of the probability function may be based on the roof data. The second term of the probability function may be based on the hail data. The first weighting variable may be dynamically determined based on at least one of: the building data, the roof data, the weather data, the hail data, or the climate region data. Attributes of the building include at least one of: a geographic location of the building, a building orientation relative to geographic cardinal directions, whether the building is single story, whether the building is two story, whether the building is multi-story, whether there is tree cover over the building, location and height of structures surrounding the building, or elevation of terrain surrounding the building. The roof data may be representative of the roofing system covering the building. Alternatively, or additionally, the roof data may be representative of a structural truss system that forms the design and shape of the roof. Furthermore, the roof data may be representative of the roof sheathing, underlayment, roofing felt, membrane, self-adhered water and ice-dam protection membrane, tar, tar paper, exterior roofing material covering, roof vents, flashing and drip edges, and any other component comprising part of the overall roof surface covering of the building. The roof data may be representative of at least one of: a roofing product age, roof area, a roofing material type, a roofing design, a roofing configuration, a roofing product condition, whether a roof is a gable roof, whether a roof is a hip roof, a roof slope, a number of layers of roofing material, a roof deck condition, a roofing manufacturer product testing result, a roofing installation criteria, a roofing product impact testing result, a roofing product wind testing result, a roofing installation, whether a roofing product complies with a particular roof impact test standard or protocol, whether the roofing product is impact resistant rated, a roofing product impact resistance rating, a roofing product wind rating, a roofing shingle specification, whether a roofing product was installed during cold conditions with hand-sealed roofing cement, a roof underlayment, a roofing facer technology, a polyiso roofing insulation, an EPS insulation, whether a roof includes roof ventilation, an attic detail, a roofing product manufacture warranty, a roofing product installer warranty, or a roofing product third-party warranty. The attributes of the storm may include at least one of: a storm meteorological signature, a storm duration, a storm direction, thermal shock, whether a storm is conducive to producing damaging hail, whether a storm is conducive to producing strong winds, key meteorological aspects of a storm, length of time that the storm impacted the roof, a direction from which the storm impacts the building, a roof temperature prior to the storm, a roof temperature after the storm, or a thermal shock to roofing material. Attributes of the hail may include at least one of: a physical characteristic of the hail, a size of the hail, a shape of the hail, a density of the hail, a hardness of the hail, a range of hail sizes produced by a storm, or a resistance to flexing of the hail. The climate region data may be representative of at least one of: a climate associated with a geographic location of the building; a humidity associated with a geographic location of the building, a temperature associated with a geographic location of the building, a moisture associated with a geographic location of the building, or whether a geographic location of the building is associated with a marine climate.

A computer-readable medium storing computer-readable instructions that, when executed by a processor, may cause the processor to generate base-line probable roof loss confidence score data associated with a roof of a building, may include a building data receiving module that, when executed by a processor of the confidence score computing device, may cause the processor of the confidence score computing device to receive building data from a building computing device. The building data may be representative of attributes of the building. The computer-readable medium may also include a roof data receiving module that, when executed by the processor of the confidence score computing device, may cause the processor of the confidence score computing device to receive roof data from a roof computing device. The roof data may be representative of a structure forming an upper covering of the building. The computer-readable medium may further include a weather data receiving module that, when executed by a processor of the confidence score computing device, may cause the processor of the confidence score computing device to receive historical weather data from a weather computing device based on the building data. The historical weather data may be representative of storm attributes associated with historical storms that have occurred in a geographic area that includes a geographic location of the building. The computer-readable medium may yet further include a hail data receiving module that, when executed by the processor of the confidence score computing device, may cause the processor of the confidence score computing device to receive historical hail data from a hail computing device based on the building data. The historical hail data may be representative of attributes of historical hail that has impacted a geographic area that includes the geographic location of the building. The computer-readable medium may include a base-line probable roof loss confidence score data generation module that, when executed by the processor of the confidence score computing device, may cause the processor of the confidence score computing device to generate base-line probable roof loss confidence score data based on the building data, the roof data, the weather data, and the hail data.

A system for underwriting insurance for a building at least partially based on a base-line probable roof loss confidence score associated with a roof of the building may include a building data receiving module stored on a memory of a confidence score computing device that, when executed by a processor of the confidence score computing device, may cause the processor of the confidence score computing device to receive building data from a building computing device. The building data may be representative of attributes of the building. The system may also include a roof data receiving module stored on the memory of the confidence score computing device that, when executed by the processor of the confidence score computing device, may cause the processor of the confidence score computing device to receive roof data from a roof computing device. The system may further include a weather data receiving module stored on the memory of the confidence score computing device that, when executed by a processor of the confidence score computing device, may cause the processor of the confidence score computing device to receive historical weather data from a weather computing device based on the building data. The system may yet further include a hail data receiving module stored on the memory of the confidence score computing device that, when executed by the processor of the confidence score computing device, may cause the processor of the confidence score computing device to receive historical hail data from a hail computing device based on the building data. The system may include a base-line probable roof loss confidence score data generation module stored on the memory of the confidence score computing device that, when executed by the processor of the confidence score computing device, may cause the processor of the confidence score computing device to generate base-line probable roof loss confidence score data based on the building data, the roof data, the weather data, and the hail data. The system may also include a building insurance underwriting data generation module stored on the memory of the confidence score computing device that, when executed by the processor of the confidence score computing device, may cause the processor of the confidence score computing device to generate building insurance underwriting data based on the base-line probable roof loss confidence score data.

A computer-implemented method for generating insurance underwriting data for a building, wherein the insurance underwriting data is at least partially based on base-line probable roof loss confidence score data associated with a roof of the building may include receiving building data in response to a processor of a confidence score computing device executing a building data receiving module. The building data may be representative of attributes of the building. The method may also include receiving roof data in response to the processor of the confidence score computing device executing a roof data receiving module. The method may further include receiving historical weather data based on the building data in response to the processor of the confidence score computing device executing a weather data receiving module. The method may yet further include receiving historical hail data based on the building data in response to the processor of the confidence score computing device executing a hail data receiving module. The method may include receiving climate region data based on the building data in response to the processor of the confidence score computing device executing a climate region data receiving module. The method may also include generating base-line probable roof loss confidence score data based on the building data, the roof data, the weather data, the hail data, and the climate region data in response to the processor of the confidence score computing device executing a base-line probable roof loss confidence score data generation module. The method may further include generating building insurance underwriting data based on the base-line probable roof loss confidence score data in response to the processor of the confidence score computing device executing a building insurance underwriting data generation module.

A computer-readable medium storing computer-readable instructions that, when executed by a processor, may cause the processor to generate building insurance underwriting data at least partially based on base-line probable roof loss confidence score data associated with a roof of the building, may include a building data receiving module that, when executed by a processor of the confidence score computing device, causes the processor of the confidence score computing device to receive building data from a building computing device. The building data may be representative of attributes of the building. The computer-readable medium may also include a roof data receiving module that, when executed by the processor of the confidence score computing device, may cause the processor of the confidence score computing device to receive roof data. The computer-readable medium may further include a weather data receiving module that, when executed by a processor of the confidence score computing device, may cause the processor of the confidence score computing device to receive historical weather data based on the building data. The computer-readable medium may yet further include a hail data receiving module that, when executed by the processor of the confidence score computing device, may cause the processor of the confidence score computing device to receive historical hail data based on the building data. The computer-readable medium may include a base-line probable roof loss confidence score data generation module that, when executed by the processor of the confidence score computing device, may cause the processor of the confidence score computing device to generate base-line probable roof loss confidence score data based on the building data, the roof data, the weather data, and the hail data. The computer-readable medium may also include a building insurance underwriting data generation module that, when executed by the processor of the confidence score computing device, may cause the processor of the confidence score computing device to generate building insurance underwriting data based on the base-line probable roof loss confidence score data.

A system for generating a probable roof loss confidence score based on a particular weather event, wherein the probable roof loss confidence score is associated with a roof of a building, may include a base-line probable roof loss confidence score data receiving module stored on a memory of a confidence score computing device that, when executed by a processor of the confidence score computing device, may cause the processor of the confidence score computing device to receive base-line probable roof loss confidence score data. The base-line probable roof loss confidence score data may be at least partially based on historical weather data and historical hail data. The system may also include a weather data receiving module stored on the memory of the confidence score computing device that, when executed by a processor of the confidence score computing device, may cause the processor of the confidence score computing device to receive weather data from a weather computing device. The weather data may be representative of storm attributes associated with a storm that occurred in a geographic area that includes a geographic location of the building. The system may further include a hail data receiving module stored on the memory of the confidence score computing device that, when executed by the processor of the confidence score computing device, may cause the processor of the confidence score computing device to receive hail data from a hail computing device. The hail data may be representative of attributes of hail that has impacted a geographic area that includes the geographic location of the building. The system may yet further include a probable roof loss confidence score data receiving module stored on the memory of the confidence score computing device that, when executed by the processor of the confidence score computing device, may cause the processor of the confidence score computing device to generate probable roof loss confidence score data based on the base-line probable roof loss confidence score data, the weather data, and the hail data.

The system may include a building data receiving module stored on the memory of the confidence score computing device that, when executed by the processor of the confidence score computing device, may cause the processor of the confidence score computing device to receive building data from a building computing device. The building data may be representative of attributes of the building. The system may also include a roof data receiving module stored on the memory of the confidence score computing device that, when executed by the processor of the confidence score computing device, may cause the processor of the confidence score computing device to receive roof data from a roof computing device. The roof data may be representative of a structure forming an upper covering of the building. The system may also include a climate region data receiving module stored on the memory of the confidence score computing device that, when executed by the processor of the confidence score computing device, may cause the processor of the confidence score computing device to receive climate region data from a climate region computing device based on the building data. The base-line probable roof loss confidence score data may be further based on the building data, the roof data, and the climate region data.

The system may include a probable roof loss confidence score verification data receiving module stored on the memory of the confidence score computing device that, when executed by the processor of the confidence score computing device, may cause the processor of the confidence score computing device to receive probable roof loss confidence score verification data. The system may also include a verified probable roof loss confidence score data generation module stored on the memory of the confidence score computing device that, when executed by the processor of the confidence score computing device, may cause the processor of the confidence score computing device to generate verified probable roof loss confidence score data based on a comparison of the probable roof loss confidence score data with the probable roof loss confidence score verification data. The system may further include a verified probable roof loss confidence score data storage module stored on the memory of the confidence score computing device that, when executed by the processor of the confidence score computing device, may cause the processor of the confidence score computing device to store the verified probable roof loss confidence score data.

A computer-implemented method for generating probable roof loss confidence score data based on a particular weather event, wherein the probable roof loss confidence score data is associated with a roof of a building, may include receiving base-line probable roof loss confidence score data in response to a processor of a confidence score computing device executing a base-line probable roof loss confidence score data receiving module. The base-line probable roof loss confidence score data may be at least partially based on historical weather data and historical hail data. The method may also include receiving historical hail data from a hail computing device based on the building data in response to the processor of the confidence score computing device executing a hail data receiving module. The hail data may be representative of attributes of historical hail that has impacted a geographic area that includes the geographic location of the building. The method may further include receiving climate region data from a climate region computing device based on the building data in response to the processor of the confidence score computing device executing a climate region data receiving module. The method may yet further include generating base-line probable roof loss confidence score data based on the building data, the roof data, the weather data, the hail data, and the climate region data in response to the processor of the confidence score computing device executing a base-line probable roof loss confidence score data generation module.

The method may include receiving building data from a building computing device in response to the processor of the confidence score computing device executing a building data receiving module. The building data may be representative of attributes of the building. The method may also include receiving roof data from a roof computing device in response to the processor of the confidence score computing device executing a roof data receiving module. The roof data may be representative of a structure forming an upper covering of the building. The method may further include receiving historical weather data from a weather computing device based on the building data in response to the processor of the confidence score computing device executing a weather data receiving module. The weather data may be representative of storm attributes associated with historical storms that have occurred in a geographic area that includes a geographic location of the building. The method may yet further include receiving historical hail data from a hail computing device based on the building data in response to the processor of the confidence score computing device executing a hail data receiving module. The hail data may be representative of attributes of historical hail that has impacted a geographic area that includes the geographic location of the building. The method may include receiving climate region data from a climate region computing device based on the building data in response to the processor of the confidence score computing device executing a climate region data receiving module. The base-line probable roof loss confidence score data may be further based on the building data, the roof data, the weather data, the hail data, and the climate region data. Execution of the probable roof loss confidence score data generation module may cause the processor of the confidence score computing device to implement a probability function to generate the probable roof loss confidence score data. A contribution of a first term of the probability function may be weighted, via a first weighting variable, relative to a second term of the probability function. The first term of the probability function may be based on the roof data, and wherein the second term of the probability function is based on the hail data. The first weighting variable may be dynamically determined based on at least one of: the building data, the roof data, the weather data, the hail data, or the climate region data.

A computer-readable medium storing computer-readable instructions that, when executed by a processor, may cause the processor to generate probable roof loss confidence score data based on a particular weather event, wherein the probable roof loss confidence score data is associated with a roof of a building, may include a base-line probable roof loss confidence score data receiving module that, when executed by a processor of a confidence score computing device, may cause the processor of the confidence score computing device to receive base-line probable roof loss confidence score data. The base-line probable roof loss confidence score data may be at least partially based on historical weather data and historical hail data. The computer-readable medium may also include a weather data receiving module that, when executed by a processor of the confidence score computing device, may cause the processor of the confidence score computing device to receive weather data. The weather data may be representative of storm attributes associated with a storm that occurred in a geographic area that includes a geographic location of the building. The computer-readable medium may further include a hail data receiving module that, when executed by the processor of the confidence score computing device, may cause the processor of the confidence score computing device to receive hail data. The hail data may be representative of attributes of hail that has impacted a geographic area that includes the geographic location of the building. The computer-readable medium may yet further include a probable roof loss confidence score data receiving module that, when executed by the processor of the confidence score computing device, may cause the processor of the confidence score computing device to generate probable roof loss confidence score data based on the base-line probable roof loss confidence score data, the weather data, and the hail data.

A system for performing an insurance claims process based on an event driven probable roof loss confidence score, wherein the probable roof loss confidence score is associated with a roof of a building, may include a base-line probable roof loss confidence score data receiving module stored on a memory of a confidence score computing device that, when executed by a processor of the confidence score computing device, may cause the processor of the confidence score computing device to receive base-line probable roof loss confidence score data. The base-line probable roof loss confidence score data may be at least partially based on historical weather data and historical hail data. The system may also include a weather data receiving module stored on the memory of the confidence score computing device that, when executed by a processor of the confidence score computing device, may cause the processor of the confidence score computing device to receive weather data from a weather computing device. The weather data may be representative of storm attributes associated with a storm that occurred in a geographic area that includes a geographic location of the building. The system may further include a hail data receiving module stored on the memory of the confidence score computing device that, when executed by the processor of the confidence score computing device, may cause the processor of the confidence score computing device to receive hail data from a hail computing device. The hail data may be representative of attributes of hail that has impacted a geographic area that includes the geographic location of the building. The system may yet further include a probable roof loss confidence score data receiving module stored on the memory of the confidence score computing device that, when executed by the processor of the confidence score computing device, may cause the processor of the confidence score computing device to generate probable roof loss confidence score data based on the base-line probable roof loss confidence score data, the weather data, and the hail data. The system may include a building insurance claim data generation module stored on the memory of the confidence score computing device that, when executed by the processor of the confidence score computing device, may cause the processor of the confidence score computing device to generate building insurance claim data based on the probable roof loss confidence score data.

A computer-implemented method for performing an insurance claims process based on an event driven probable roof loss confidence score, may include receiving base-line probable roof loss confidence score data in response to a processor of a confidence score computing device executing a base-line probable roof loss confidence score data receiving module. The base-line probable roof loss confidence score data may be at least partially based on historical weather data and historical hail data. The method may also include receiving historical hail data from a hail computing device based on the building data in response to the processor of the confidence score computing device executing a hail data receiving module. The hail data may be representative of attributes of historical hail that has impacted a geographic area that includes the geographic location of the building. The method may further include receiving climate region data from a climate region computing device based on the building data in response to the processor of the confidence score computing device executing a climate region data receiving module. The method may yet further include generating base-line probable roof loss confidence score data based on the building data, the roof data, the weather data, the hail data, and the climate region data in response to the processor of the confidence score computing device executing a base-line probable roof loss confidence score data generation module. The method may include generating building insurance claim data based on the probable roof loss confidence score data in response to the processor of the confidence score computing device executing a building insurance claim data generation module.

A computer-readable medium storing computer-readable instructions that, when executed by a processor, cause the processor to perform an insurance claims process based on an event driven probable roof loss confidence score, may include a base-line probable roof loss confidence score data receiving module that, when executed by a processor of a confidence score computing device, may cause the processor of the confidence score computing device to receive base-line probable roof loss confidence score data. The base-line probable roof loss confidence score data may be at least partially based on historical weather data and historical hail data. The computer-readable medium may also include a weather data receiving module that, when executed by a processor of the confidence score computing device, may cause the processor of the confidence score computing device to receive weather data. The weather data may be representative of storm attributes associated with a storm that occurred in a geographic area that includes a geographic location of the building. The computer-readable medium may further include a hail data receiving module that, when executed by the processor of the confidence score computing device, may cause the processor of the confidence score computing device to receive hail data. The hail data may be representative of attributes of hail that has impacted a geographic area that includes the geographic location of the building. The computer-readable medium may yet further include a probable roof loss confidence score data receiving module that, when executed by the processor of the confidence score computing device, may cause the processor of the confidence score computing device to generate probable roof loss confidence score data based on the base-line probable roof loss confidence score data, the weather data, and the hail data. The computer-readable medium may include a building insurance claim data generation module that, when executed by the processor of the confidence score computing device, may cause the processor of the confidence score computing device to generate building insurance claim data based on the probable roof loss confidence score data.

A system for performing an insurance property loss mitigation process based on an event driven probable roof loss confidence score, wherein the probable roof loss confidence score is associated with a roof of a building, may include a base-line probable roof loss confidence score data receiving module stored on a memory of a confidence score computing device that, when executed by a processor of the confidence score computing device, may cause the processor of the confidence score computing device to receive base-line probable roof loss confidence score data. The base-line probable roof loss confidence score data may be at least partially based on historical weather data and historical hail data. The system may also include a weather data receiving module stored on the memory of the confidence score computing device that, when executed by a processor of the confidence score computing device, may cause the processor of the confidence score computing device to receive weather data from a weather computing device. The weather data may be representative of storm attributes associated with a storm that occurred in a geographic area that includes a geographic location of the building. The system may further include a hail data receiving module stored on the memory of the confidence score computing device that, when executed by the processor of the confidence score computing device, may cause the processor of the confidence score computing device to receive hail data from a hail computing device. The hail data may be representative of attributes of hail that has impacted a geographic area that includes the geographic location of the building. The system may yet further include a probable roof loss confidence score data receiving module stored on the memory of the confidence score computing device that, when executed by the processor of the confidence score computing device, may cause the processor of the confidence score computing device to generate probable roof loss confidence score data based on the base-line probable roof loss confidence score data, the weather data, and the hail data. The system may include a building insurance property loss mitigation data generation module stored on the memory of the confidence score computing device that, when executed by the processor of the confidence score computing device, may cause the processor of the confidence score computing device to generate building insurance property loss mitigation data based on the probable roof loss confidence score data.

A computer-implemented method for performing an insurance property loss mitigation process based on an event driven probable roof loss confidence score, may include receiving base-line probable roof loss confidence score data in response to a processor of a confidence score computing device executing a base-line probable roof loss confidence score data receiving module. The base-line probable roof loss confidence score data may be at least partially based on historical weather data and historical hail data. The method may also include receiving historical hail data from a hail computing device based on the building data in response to the processor of the confidence score computing device executing a hail data receiving module. The hail data may be representative of attributes of historical hail that has impacted a geographic area that includes the geographic location of the building. The method may further include receiving climate region data from a climate region computing device based on the building data in response to the processor of the confidence score computing device executing a climate region data receiving module. The method may yet further include generating base-line probable roof loss confidence score data based on the building data, the roof data, the weather data, the hail data, and the climate region data in response to the processor of the confidence score computing device executing a base-line probable roof loss confidence score data generation module. The method may include generating building insurance property loss mitigation data based on the probable roof loss confidence score data in response to the processor of the confidence score computing device executing a building insurance property loss mitigation data generation module.

A computer-readable medium storing computer-readable instructions that, when executed by a processor, cause the processor to perform an insurance property loss mitigation process based on an event driven probable roof loss confidence score, may include a base-line probable roof loss confidence score data receiving module that, when executed by a processor of a confidence score computing device, may cause the processor of the confidence score computing device to receive base-line probable roof loss confidence score data. The base-line probable roof loss confidence score data may be at least partially based on historical weather data and historical hail data. The computer-readable medium may also include a weather data receiving module that, when executed by a processor of the confidence score computing device, may cause the processor of the confidence score computing device to receive weather data. The weather data may be representative of storm attributes associated with a storm that occurred in a geographic area that includes a geographic location of the building. The computer-readable medium may further include a hail data receiving module that, when executed by the processor of the confidence score computing device, may cause the processor of the confidence score computing device to receive hail data. The hail data may be representative of attributes of hail that has impacted a geographic area that includes the geographic location of the building. The computer-readable medium may yet further include a probable roof loss confidence score data receiving module that, when executed by the processor of the confidence score computing device, may cause the processor of the confidence score computing device to generate probable roof loss confidence score data based on the base-line probable roof loss confidence score data, the weather data, and the hail data. The computer-readable medium may include a building insurance property loss mitigation data generation module that, when executed by the processor of the confidence score computing device, may cause the processor of the confidence score computing device to generate building insurance property loss mitigation data based on the probable roof loss confidence score data.

A system for generating a base-line probable building exterior loss confidence score associated with an exterior of a building may include a building data receiving module stored on a memory of a confidence score computing device that, when executed by a processor of the confidence score computing device, may cause the processor of the confidence score computing device to receive building data from a building computing device. The building data may be representative of attributes of the building. The system may also include an building exterior data receiving module stored on the memory of the confidence score computing device that, when executed by the processor of the confidence score computing device, may cause the processor of the confidence score computing device to receive roof data from a building exterior computing device. The building exterior data may be representative of a structure forming an exterior of the building. The system may further include a weather data receiving module stored on the memory of the confidence score computing device that, when executed by a processor of the confidence score computing device, may cause the processor of the confidence score computing device to receive historical weather data from a weather computing device based on the building data. The historical weather data may be representative of storm attributes associated with historical storms that have occurred in a geographic area that includes a geographic location of the building. The system may yet further include a hail data receiving module stored on the memory of the confidence score computing device that, when executed by the processor of the confidence score computing device, may cause the processor of the confidence score computing device to receive historical hail data from a hail computing device based on the building data. The historical hail data may be representative of attributes of historical hail that has impacted a geographic area that includes the geographic location of the building. The system may also include a base-line probable building exterior loss confidence score data generation module stored on the memory of the confidence score computing device that, when executed by the processor of the confidence score computing device, may cause the processor of the confidence score computing device to generate base-line probable building exterior loss confidence score data based on the building data, the building exterior data, the weather data, and the hail data.

Additional Considerations

This detailed description is to be construed as exemplary only and does not describe every possible embodiment, as describing every possible embodiment would be impractical, if not impossible. One may implement numerous alternate embodiments, using either current technology or technology developed after the filing date of this application.

Further to this point, although some embodiments described herein utilize sensitive information (e.g., personal identification information, credit information, income information, etc.), the embodiments described herein are not limited to such examples. Instead, the embodiments described herein may be implemented in any suitable environment in which it is desirable to identify and control specific type of information. For example, the aforementioned embodiments may be implemented by a financial institution to identify and contain bank account statements, brokerage account statements, tax documents, etc. To provide another example, the aforementioned embodiments may be implemented by a lender to not only identify, re-route, and quarantine credit report information, but to apply similar techniques to prevent the dissemination of loan application documents that are preferably delivered to a client for signature in accordance with a more secure means (e.g., via a secure login to a web server) than via email.

Furthermore, although the present disclosure sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims. Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software), may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of some of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

This detailed description is to be construed as exemplary only and does not describe every possible embodiment, as describing every possible embodiment would be impractical, if not impossible. One may be implement numerous alternate embodiments, using either current technology or technology developed after the filing date of this application.

What is claimed is:

1. A system for performing an insurance claim process based on probable roof loss confidence score data based on a particular weather event, wherein the probable roof loss confidence score data is associated with a roof of a building, the system comprising:
   one or more processors;
   a non-transitory computer-readable medium; and
   instructions stored on the non-transitory computer-readable medium that, when executed by the one or more processors, cause the one or more processors to:
      receive building data from a building computing device, wherein the building data is representative of attributes of the building;
      receive roof data from a roof computing device, wherein the roof data is representative of a structure forming an upper covering of the building;
      receive base-line probable roof loss confidence score data for the building, wherein the base-line probable roof loss confidence score data is at least partially based on historical weather data, historical hail data, the roof data, and climate region data;
      receive weather data, wherein the weather data is representative of at least one storm attribute associated with a storm associated with the particular weather event that occurred in a geographic area that includes a geographic location of the building;
      receive hail data, wherein the hail data is associated with the building and is representative of one or more attributes of hail, associated with the particular weather event, that has impacted the geographic area, the hail data including at least one of image data, video data, or audio data collected by a smart home device disposed at the building in real time;

analyze the hail data to detect a hail event signature in the at least one of the image data, the video data, or the audio data;

responsive to detecting the hail event signature, estimate at least one attribute of the one or more attributes of the hail based on the at least one of the image data, the video data, or the audio data;

generate probable roof loss confidence score data based on the base-line probable roof loss confidence score data, the weather data, the hail data, the roof data, and the at least one estimated attribute by:

determining a current roof condition of the roof of the building based upon at least one of the building data or the roof data; and determining a predicted level of roof damage to the roof of the building over a time interval based upon the base-line probable roof loss confidence score data, the current roof condition, and the estimated at least one attribute of the one or more attributes of the hail associated with the particular weather event; and generate building insurance claim data based on the probable roof loss confidence score data.

2. The system of claim 1, wherein the instructions further cause the one or more processors to:

receive climate region data from a climate region computing device based on the building data, wherein the base-line probable roof loss confidence score data is further based on the building data, the roof data, and the climate region data.

3. The system of claim 1, wherein the instructions further cause the one or more processors to receive probable roof loss confidence score verification data.

4. The system of claim 1, wherein the probable roof loss confidence score data indicates a probability that the roof is a total loss due to the particular weather event, and wherein the instructions further cause the one or more processors to:

in response to determining that the probable roof loss confidence score data indicates that the probability is above a predetermined percentage, automatically process an insurance claim for the roof.

5. The system of claim 1, wherein the storm attributes of the storm include at least one of: a storm meteorological signature, a storm duration, a storm direction, thermal shock, whether the storm is conducive to producing damaging hail, whether the storm is conducive to producing strong winds, key meteorological aspects of the storm, length of time that the storm impacted the roof, a direction from which the storm impacts the building, a roof temperature prior to the storm, a roof temperature after the storm, or a thermal shock to roofing material.

6. A method for performing an insurance claim process based on probable roof loss confidence score data based on a particular weather event, wherein the probable roof loss confidence score data is associated with a roof of a building, the method comprising:

receiving, by one or more processors, building data from a building computing device, wherein the building data is representative of attributes of the building;

receiving, by the one or more processors, roof data from a roof computing device, wherein the roof data is representative of a structure forming an upper covering of the building;

receiving, by the one or more processors, climate region data from a climate region computing device based on building data;

receiving, by the one or more processors, a base-line probable roof loss confidence score data for the building, wherein the base-line probable roof loss confidence score data is at least partially based on historical weather data, historical hail data, the roof data, and the climate region data;

receiving, by the one or more processors, hail data, wherein the hail data is associated with the building and is representative of one or more attributes of hail associated with the particular weather event that has impacted a geographic area that includes a geographic location of the building, the hail data including at least one of image data, video data, or audio data collected by a smart home device disposed at the building;

analyzing, by the one or more processors, the hail data to detect a hail event signature in the at least one of the image data, the video data, or the audio data;

responsive to detecting the hail event signature, estimating, by the one or more processors, at least one attribute of the one or more attributes of the hail based on the at least one of the image data, the video data, or the audio data;

generating, by the one or more processors, probable roof loss confidence score data based on the base-line probable roof loss confidence score data, the hail data, the roof data, and the at least one estimated attribute by:

determining a current roof condition of the roof of the building based upon at least one of the building data or the roof data; and determining a predicted level of roof damage to the roof of the building over a time interval based upon the base-line probable roof loss confidence score data, the current roof condition, and the estimated at least one attribute of the one or more attributes of the hail associated with the particular weather event;

generating, by the one or more processors, building insurance claim data based on the probable roof loss confidence score data; and sending, by the one or more processors, a notification to an insurance adjustor, wherein the notification includes the generated building insurance claim data.

7. The method of claim 6, further comprising:

receiving, by the one or more processors, historical weather data from a weather computing device based on the building data, wherein the historical weather data is representative of storm attributes associated with historical storms that have occurred in a geographic area that includes a geographic location of the building; and receiving, by the one or more processors, historical hail data from a hail computing device based on the building data, wherein the historical hail data is representative of attributes of historical hail that has impacted a geographic area that includes the geographic location of the building.

8. The method of claim 7, wherein the storm attributes include at least one of: a storm meteorological signature, a storm duration, a storm direction, thermal shock, whether a storm is conducive to producing damaging hail, whether a storm is conducive to producing strong winds, key meteorological aspects of a storm, length of time that the storm impacted the roof, a direction from which the storm impacts the building, a roof temperature prior to the storm, a roof temperature after the storm, or a thermal shock to roofing material.

9. The method of claim 6, wherein the probable roof loss confidence score data indicates a probability that the roof is a total loss due to the particular weather event, and wherein the method further comprises:

in response to determining that the probable roof loss confidence score data indicates that the probability is above a predetermined percentage, automatically processing, by the one or more processors, an insurance claim for the roof.

10. The method of claim 6, wherein generating the probable roof loss confidence score data includes:

implementing a probability function to generate the probable roof loss confidence score, wherein a contribution of a first term of the probability function is weighted, via a first weighting variable, relative to a second term of the probability function.

11. The method of claim 10, wherein the first term of the probability function is determined based on the roof data, and wherein the second term of the probability function is based on the hail data.

12. The method of claim 10, wherein the first weighting variable is dynamically determined based on at least one of: the building data, the roof data, the weather data, the hail data, or the climate region data.

13. The method of claim 6, wherein the attributes of the building include at least one of: a geographic location of the building, a building orientation relative to geographic cardinal directions, whether the building is single story, whether the building is two story, whether the building is multi-story, whether there is tree cover over the building, location and height of structures surrounding the building, or elevation of terrain surrounding the building.

14. The method of claim 6, wherein the roof data is representative of at least one of: a roofing system covering the building, a structural truss system that forms the design and shape of the roof, roof sheathing, underlayment, roofing felt, membrane, self-adhered water and ice-dam protection membrane, tar, tar paper, exterior roofing material covering, roof vents, flashing and drip edges, a component comprising part of the overall roof surface covering of the building, a roofing product age, roof area, a roofing material type, a roofing design, a roofing configuration, a roofing product condition, whether a roof is a gable roof, whether a roof is a hip roof, a roof slope, a number of layers of roofing material, a roof deck condition, a roofing manufacturer product testing result, a roofing installation criteria, a roofing product impact testing result, a roofing product wind testing result, a roofing installation, whether a roofing product complies with a particular roof impact test standard or protocol, whether the roofing product is impact resistant rated, a roofing product impact resistance rating, a roofing product wind rating, a roofing shingle specification, whether a roofing product was installed during cold conditions with hand-sealed roofing cement, a roof underlayment, a roofing facer technology, a polyiso roofing insulation, an EPS insulation, whether a roof includes roof ventilation, an attic detail, a roofing product manufacture warranty, a roofing product installer warranty, or a roofing product third-party warranty.

15. The method of claim 6, wherein:

the hail data comprises audio data collected by the smart home device;

the hail event signature comprises an audio signature of the hail associated with the particular weather event; and the attributes of the hail include at least one of: a physical characteristic of the hail, a size of the hail, a shape of the hail, a density of the hail, a hardness of the hail, a range of hail sizes produced by a storm, or a resistance to flexing of the hail.

16. The method of claim 6, wherein the climate region data is representative of at least one of: a climate associated with a geographic location of the building; a humidity associated with a geographic location of the building, a temperature associated with a geographic location of the building, a moisture associated with a geographic location of the building, or whether a geographic location of the building is associated with a marine climate.

17. A tangible, non-transitory computer-readable medium storing instructions for performing an insurance property loss mitigation process based on an event driven probable roof loss confidence score data based on a particular weather event, wherein the probable roof loss confidence score data is associated with a roof of a building, and wherein the instructions, when executed by one or more processors, cause the one or more processors to:

receive building data from a building computing device, wherein the building data is representative of attributes of the building;

receive roof data from a roof computing device, wherein the roof data is representative of a structure forming an upper covering of the building;

receive a base-line probable roof loss confidence score data for the building, wherein the base-line probable roof loss confidence score data is at least partially based on historical weather data, historical hail data, the roof data, and climate region data;

receive weather data, wherein the weather data is representative of storm attributes associated with a storm, associated with the particular weather event, that occurred in a geographic area that includes a geographic location of the building;

receive hail data, wherein the hail data is associated with the building and is representative of one or more attributes of hail, associated with the particular weather event, that has impacted the geographic area, the hail data including at least one of image data, video data, or audio data collected by a smart home device disposed at the building;

analyze the hail data to detect a hail event signature in the at least one of the image data, the video data, or the audio data;

responsive to detecting the hail event signature, estimate at least one attribute of the one or more attributes of the hail based on the at least one of the image data, the video data, or the audio data;

generate probable roof loss confidence score data based on the base-line probable roof loss confidence score data, the weather data, the hail data, the roof data, and the at least one estimated attribute by:

determining a current roof condition of the roof of the building based upon at least one of the building data or the roof data; and determining a predicted level of roof damage to the roof of the building over a time interval based upon the base-line probable roof loss confidence score data, the current roof condition, and the estimated at least one attribute of the one or more attributes of the hail associated with the particular weather event; and generate building insurance claim data based on the probable roof loss confidence score data.

18. The tangible, non-transitory computer-readable medium of claim 17, further comprising instructions, when executed by one or more processors, cause the one or more processors to:
  receive climate region data from a climate region computing device based on the building data, wherein the base-line probable roof loss confidence score data is further based on the building data, the roof data, and the climate region data.

19. The tangible, non-transitory computer-readable medium of claim 17, further comprising instructions, when executed by one or more processors, cause the one or more processors to receive probable roof loss confidence score verification data.

20. The tangible, non-transitory computer-readable medium of claim 17, wherein the probable roof loss confidence score data indicates a probability that the roof is a total loss due to the particular weather event, and wherein the instructions further cause the one or more processors to:
  in response to determining that the probable roof loss confidence score data indicates that the probability is above a predetermined percentage, automatically process an insurance claim for the roof.

* * * * *